US007302088B2

(12) United States Patent
Amano et al.

(10) Patent No.: US 7,302,088 B2
(45) Date of Patent: Nov. 27, 2007

(54) PERSONAL VERIFICATION DEVICE, CARD-TYPE INFORMATION STORAGE MEDIUM, AND INFORMATION PROCESSING SYSTEM USING THE SAME

(75) Inventors: Kazuhiko Amano, Yokohama (JP); Mitsutoshi Miyasaka, Suwa (JP); Tatsuya Shimoda, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 889 days.

(21) Appl. No.: 10/614,873

(22) Filed: Jul. 9, 2003

(65) Prior Publication Data
US 2005/0053264 A1 Mar. 10, 2005

(30) Foreign Application Priority Data
Jul. 12, 2002 (JP) ............................. 2002-203991
Nov. 8, 2002 (JP) ............................. 2002-325133

(51) Int. Cl.
*G06K 9/00* (2006.01)
(52) U.S. Cl. ...................................................... 382/124
(58) Field of Classification Search ........ 382/115–116, 382/124, 190, 209, 218; 235/382; 283/69; 340/5.2, 5.53, 5.54, 5.81; 356/71
See application file for complete search history.

(56) References Cited
U.S. PATENT DOCUMENTS

| 3,581,282 | A | * | 5/1971 | Altman ........................ 340/5.83 |
| 5,719,950 | A | * | 2/1998 | Osten et al. ................. 382/115 |
| 6,327,376 | B1 | | 12/2001 | Harkin |
| 6,943,665 | B2 | * | 9/2005 | Chornenky ................. 340/5.83 |
| 6,985,887 | B1 | * | 1/2006 | Sunstein et al. ............... 705/51 |
| 6,993,378 | B2 | * | 1/2006 | Wiederhold et al. ........ 600/509 |
| 7,013,030 | B2 | * | 3/2006 | Wong et al. ................. 382/124 |
| 2002/0013717 | A1 | * | 1/2002 | Ando et al. .................... 705/4 |
| 2002/0091328 | A1 | * | 7/2002 | Ogura .......................... 600/494 |
| 2003/0150911 | A1 | * | 8/2003 | Joseph ........................ 235/382 |

FOREIGN PATENT DOCUMENTS

| CN | 1125872 A | 7/1996 |
| CN | 1251650 A | 4/2000 |

(Continued)

OTHER PUBLICATIONS

U.S. Appl. No. 10/375,111, filed Feb. 28, 2003, Miyasaka.

*Primary Examiner*—Daniel Mariam
(74) *Attorney, Agent, or Firm*—Oliff & Berridge, PLC

(57) ABSTRACT

A personal verification device includes a fingerprint sensor which detects a fingerprint of an operator, and a pulse wave sensor which detects a pulse wave of the operator. An index extraction section processes the pulse wave detected by the pulse wave sensor and extracts at least one index. First reference information which is compared with a fingerprint is stored in a first reference information storage section. Second reference information which is compared with the at least one index is stored in a second reference information storage section. A verification section outputs a signal indicating that the operator is true when it is determined that the operator is a registered person based on the result of comparison between the fingerprint and the first reference information, and it is determined that the operator is alive based on the result of comparison between the at least one index and the second reference information.

28 Claims, 16 Drawing Sheets

| | FOREIGN PATENT DOCUMENTS | |
|---|---|---|
| CN | 1268719 A | 10/2000 |
| EP | 1 041 356 A1 | 10/2000 |
| JP | A 3-6791 | 1/1991 |
| JP | A 4-271477 | 9/1992 |
| JP | A 5-61965 | 3/1993 |
| JP | A 9-27611 | 1/1997 |
| JP | A 10-125931 | 5/1998 |
| JP | A 10-177187 | 6/1998 |
| JP | A 11-020360 | 1/1999 |
| JP | A 11-26733 | 1/1999 |
| JP | A 11-26734 | 1/1999 |
| JP | A 11-74533 | 3/1999 |
| JP | A 11-118415 | 4/1999 |
| JP | A 11-312811 | 11/1999 |
| JP | A 11-330532 | 11/1999 |
| JP | 2001-000422 | 1/2001 |
| JP | A 2001-18490 | 1/2001 |
| WO | WO 01/59733 A2 | 8/2001 |

* cited by examiner

PERSONAL VERIFICATION DEVICE, CARD-TYPE INFORMATION STORAGE MEDIUM, AND INFORMATION PROCESSING SYSTEM USING THE SAME

Japanese Patent Application No. 2002-203991 filed on Jul. 12, 2002 and Japanese Patent Application No. 2002-325133 filed on Nov. 8, 2002, are hereby incorporated by reference in their entirety.

BACKGROUND OF THE INVENTION

The present invention relates to a personal verification device, a card-type information storage medium, and an information processing system using the same.

Personal verification technology using a fingerprint sensor has been proposed. As the fingerprint sensor, a resistance sensing type fingerprint sensor (see Japanese Patent Application Laid-open No. 3-6791, for example), a photoelectric fingerprint sensor (see Japanese Patent Application Laid-open No. 4-271477, for example), a piezoelectric fingerprint sensor (see Japanese Patent Application Laid-open No. 5-61965, for example), and a capacitive fingerprint sensor (see Japanese Patent Application Laid-open No. 11-118415, for example) have been proposed.

However, since a fingerprint can be collected even after a person is dead, personal verification depending only on the fingerprint may be used for criminal purposes.

Japanese Patent Application Laid-open No. 2001-184490 discloses technology of optically reading a fingerprint of a finger scanned on a read roller, and detecting a pulse by using a pulse sensor provided near the read roller. However, such a pulse can be easily counterfeited. Moreover, since the read roller is used to detect the fingerprint, it is impossible to employ this structure for portable cards, for example.

BRIEF SUMMARY OF THE INVENTION

The present invention may provide a personal verification device which enables highly accurate personal verification so that counterfeiting of an object of verification is extremely difficult, and a card-type information storage medium and an information processing system using the personal verification device.

According to a first aspect of the present invention, there is provided a personal verification device comprising: a first detection section which detects characteristic information of an operator; a second detection section which detects a pulse wave of the operator; an index extraction section which extracts at least one index by processing the pulse wave detected by the second detection section; a first storage section which stores first reference information which is compared with the characteristic information; a second storage section which stores second reference information which is compared with the at least one index; and a verification section which outputs a signal indicating that the operator is true when the operator is determined to be the same person as a registered person based on the result of comparison between the characteristic information and the first reference information, and also to be alive based on the result of comparison between the at least one index and the second reference information. The signal indicating that the operator is true may be display information or an encrypted password. A password may be output as an electronic signal.

As the characteristic information of the operator, a fingerprint, iris, tooth mark, palm, face, voiceprint, and the like can be given. Such characteristic information is suitable for personal identification. However, such characteristic information can be collected even if the operator is not alive. Therefore, a pulse wave which is generated only from a live operator is detected by the second detection section. The index extraction section processes the detected pulse wave and extracts an index from the pulse wave. The pulse waveform is characteristic of a live human being, and an index extracted from the pulse wave is also characteristic of a live human being. Such an index can be easily compared with previously stored information. In the case where a pulse which is a component of the pulse wave is directly detected instead of the pulse wave, such a pulse can be generated artificially. On the contrary, it is extremely difficult to counterfeit the pulse waveform, and it is practically impossible to counterfeit any of the indices of the pulse wave. Therefore, according to the personal verification device of this aspect of the present invention, accuracy of personal verification is improved to a large extent, leading to improved reliability of personal verification results.

In the personal verification device according to this aspect of the present invention, the index extraction section may have any of the following features. The index extraction section may include a wave height extraction section which extracts as the at least one index a wave height of at least one of a plurality of inflection points in the pulse wave detected by the second detection section. The index extraction section may include a time extraction section which extracts as the at least one index the time until occurrence of at least one of a plurality of inflection points in the pulse wave detected by the second detection section. The index extraction section may include a wave height ratio extraction section which extracts as the at least one index the wave height ratio of a plurality of inflection points in the pulse wave detected by the second detection section. The index extraction section may includes: a calculation section which calculates an acceleration waveform of the pulse wave detected by the second detection section; and a wave height ratio extraction section which extracts as the at least one index a wave height ratio of a plurality of inflection points in the acceleration waveform. The index extraction section may include a time ratio extraction section which extracts as the at least one index the time ratio of a plurality of inflection points in the pulse wave detected by the second detection section. In this case, the time ratio extraction section may extract a ratio of a cycle and an ejection time of the pulse wave detected by the second detection section from the pulse wave. The index extraction section may be an amplifier which amplifies the pulse wave detected by the second detection section. The amplifier may extracts as the at least one index an amplification ratio when amplifying the pulse wave into a signal having an amplitude larger than a predetermined amplitude by using an auto gain control function. The amplification ratio as an index can be personal information equivalent to the vascular age.

The personal verification device may further comprise: a historical information storage section which stores historical information on the at least one index extracted by the index extraction section; and an information update section which updates the second reference information in the second storage section based on the historical information. By updating the second reference information based on the historical information, the second reference information can be changed corresponding to the index which changes with time, and an allowable range of comparison can be reduced based on the historical information.

The characteristic information may be a fingerprint. In this case, the first detection section may be a fingerprint sensor; and fingerprint information of the registered person may be stored in the first storage section.

The fingerprint sensor may detect a fingerprint by detecting capacitance which changes corresponding to ridges and valleys on a surface of a fingertip of the operator.

The fingerprint sensor may include M (M is an integer equal to or larger than two) rows of power supply lines, N (N is an integer equal to or larger than two) columns of output lines, and M×N capacitance detection elements respectively provided at intersections of the M rows of power supply lines and the N columns of output lines.

Each of the M×N capacitance detection elements may include a signal detection element and a signal amplification element; the signal detection element may include a capacitance detection electrode and a capacitance detection dielectric film; and the signal amplification element may be a thin film metal-insulator-silicon (MIS) semiconductor device for signal amplification which includes a gate electrode, a gate insulating film, and a semiconductor film.

The fingerprint sensor may further include a power supply select circuit connected to the M rows of power supply lines. The power supply select circuit may have M power supply pass gates provided between a common power supply line and the M rows of power supply lines, and each of the M power supply pass gates may be the thin film MIS semiconductor device for signal amplification which includes a gate electrode, a gate insulating film, and a semiconductor film.

The fingerprint sensor may further include a signal select circuit connected to the N columns of output lines. The signal select circuit may have N output signal pass gates provided between a common output line and the N columns of output lines, and each of the N output signal pass gates may be the thin film MIS semiconductor device for signal amplification which includes a gate electrode, a gate insulating film, and a semiconductor film.

The personal verification device may further comprise a start switch which activates the personal verification device when the fingerprint sensor detects a touch of a finger.

The second detection section may include a pulse wave sensor having a light emitting element and a light receiving element, and optically detecting the pulse wave of the operator. In this case, the fingerprint sensor may be provided on a top surface of the pulse wave sensor, and part of the fingerprint sensor intersecting the path of the light emitted by the light emitting element or received by the light receiving element may be formed of a material transparent to the wavelength of the light emitted by the light emitting element.

The pulse wave sensor may be forbidden to detect a pulse wave when a fingerprint detected by the fingerprint sensor has been determined to be false by the verification section. This enables optical inspection of the pulse wave which consumes a comparatively large amount of power to be omitted.

The personal verification device may further comprise a low-cut filter which cuts out a low frequency component from the pulse wave detected by the pulse wave sensor. Since frequency components which reflect autonomic nervous functions such as parasympathetic nervous functions and sympathetic nervous functions and frequency components due to body movement are contained in the low frequency band, these frequency components must be removed. The low-cut filter may cut out a low frequency in a range from 0.4 to 0.5 Hz. This is because the above unnecessary frequency components can be removed without impairing the characteristics of the pulse waveform.

According to a second aspect of the present invention, there is provided a personal verification device comprising:

a detection section which detects an operator's biological information which changes with time;

a first storage section which stores reference information which is compared with the biological information;

a second storage section which stores historical information on the biological information detected by the detection section;

an update section which updates the reference information in the first storage section, based on the historical information in the second storage section; and a verification section which outputs a signal indicating that the operator is true, based on the result of comparison between the biological information and the reference information.

As the biological information, a pulse wave, brain wave, electrocardiogram, electromyogram, body surface temperature, radiant heat from the body surface, and the like can be given. Of these, a pulse wave is suitable as the biological information which changes with time. In particular, a wave height ratio of inflection points included in an acceleration waveform of the pulse wave has age dependence. Therefore, the reference information which is compared with the biological information which changes with time must be updated as time elapses. In the personal verification device according to this aspect of the present invention, the biological information is stored as historical information each time the biological information is detected, and the reference information is updated based on the historical information. Since the reference information is automatically updated in this manner, a personal verification device having an automatic update function can be used semipermanently. As the reference information, a moving average value of the biological information and a deviation which indicates the degree of divergence between the moving average value and the biological information are used. The next moving average value is estimated from the moving average value of the several latest measured values, and a range of a value k ($1 \leq k \leq 3$) times as many as the deviation from the estimated value (midpoint) is employed as the allowable range of the next biological information. This remarkably reduces the possibility of rejecting a registered person by mistake. Moreover, illegal use by counterfeiting a pulse wave can be prevented.

According to a third aspect of the present invention, there is provided a card-type information storage medium comprising any of the above personal verification devices.

According to a fourth aspect of the present invention, there is provided a card-type information storage medium comprising any of the above personal verification devices, wherein a second thin film device having at least the fingerprint sensor is provided on a top surface of a first thin film device having at least the pulse wave sensor.

The card-type information storage medium may further comprise a display section which displays notification that the card-type information storage medium is in an available state, based on the signal from the verification section.

According to a fifth aspect of the present invention, there is provided an information processing system comprising:

any of the above card-type information storage media; and an information processing device which performs processing based on information in the card-type information storage medium, wherein the information processing device reads information other than the information used for personal verification from the card-type information storage medium, after the signal is input from the verification section.

The personal information used for personal verification is thus processed only in the card-type information storage medium and does not leak from the card-type information storage medium.

The information processing device may have a power supply section which supplies power to the card-type information storage medium. A power supply may be included in any of the above card-type information storage media.

DETAILED DESCRIPTION OF THE EMBODIMENT

Figure 1A:
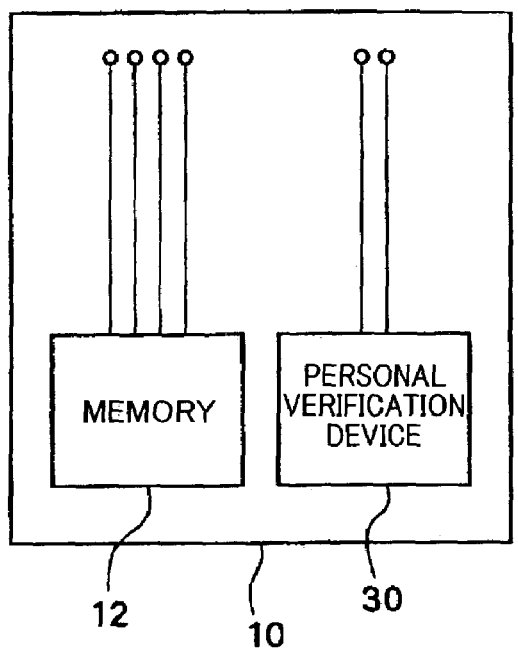
FIGS. 1A to 1C are diagrams schematically showing examples of a card-type information storage medium according to one embodiment of the present invention.
Figure 1B:
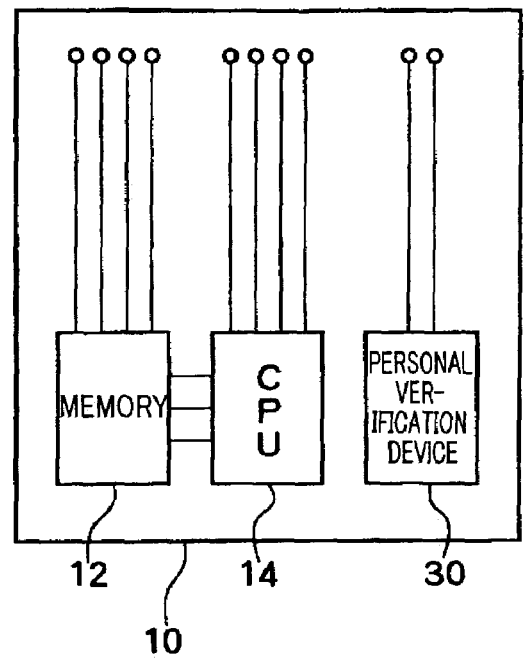
Figure 1C:
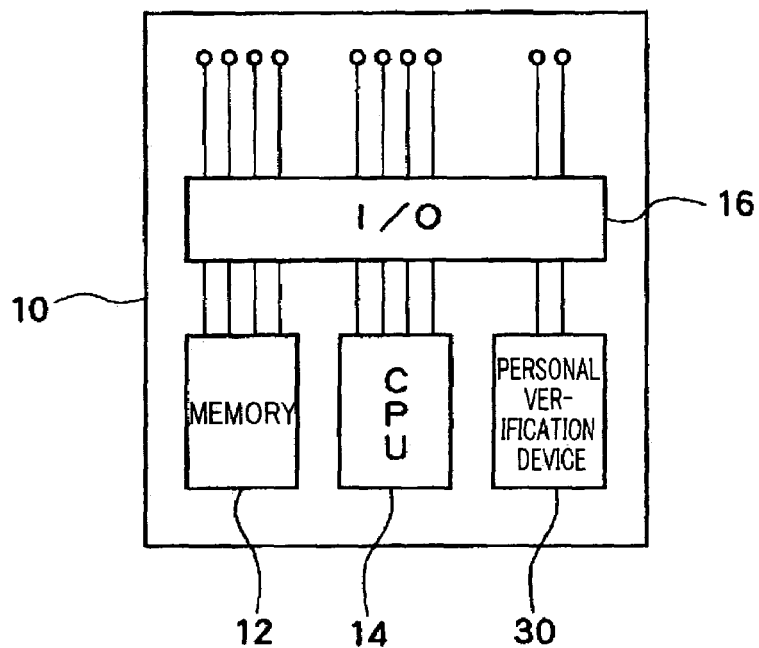
Figure 2A:
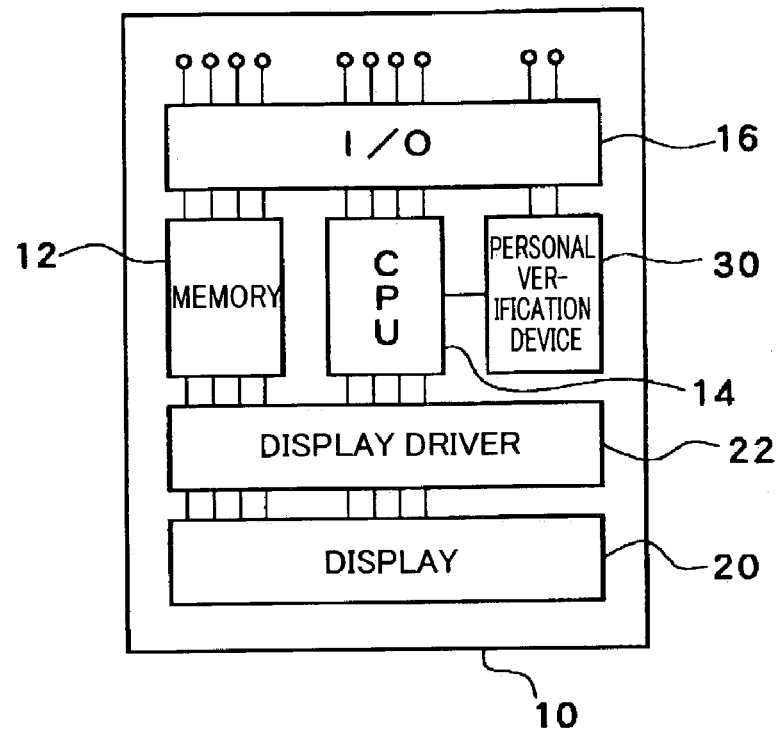
FIGS. 2A and 2B are diagrams schematically showing examples of a card-type information storage medium according to another embodiment of the present invention.
Figure 2B:
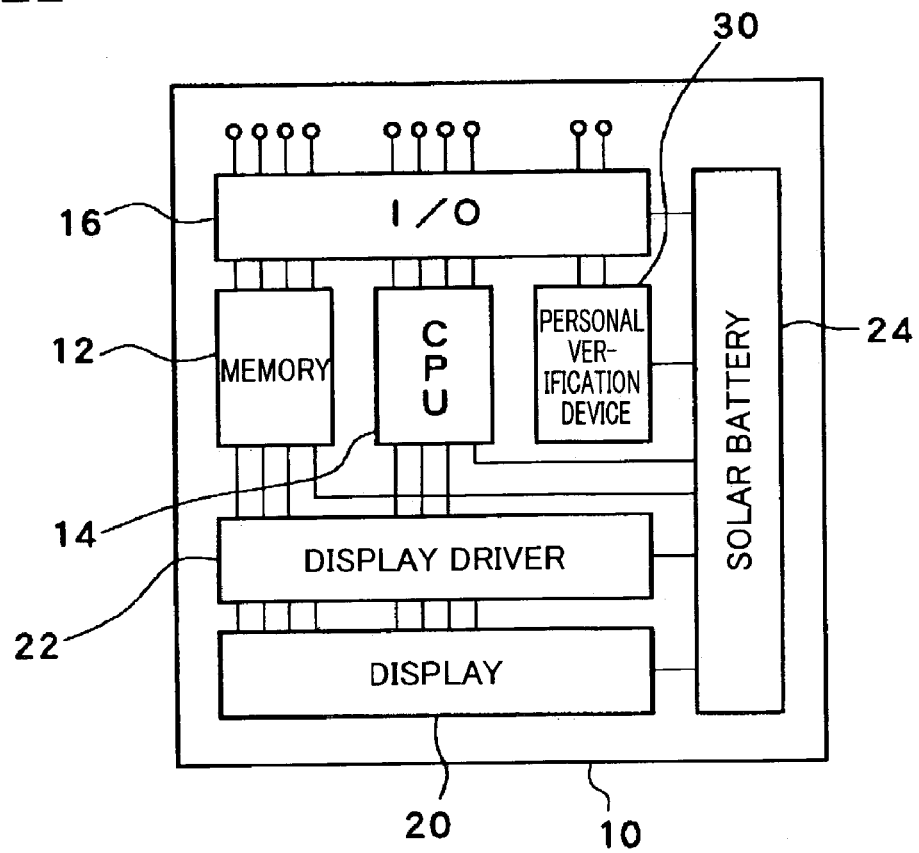

An embodiment in which the present invention is applied to a card-type information storage medium including a personal verification device and to an information processing system using the same is described below with reference to the drawings.

Card-Type Information Storage Medium

As IC cards including an integrated circuit (IC), a memory card, an I/O (input/output circuit) card, a card conforming to ISO, and the like are known. The present embodiment illustrates a case where a personal verification device is provided to these various types of cards used as credit cards, cash cards, and the like.

FIGS. 1A to 1C and FIGS. 2A and 2B show examples of a card-type information storage medium in the present embodiment. A card shown in FIG. 1A includes a memory 12 formed on a substrate 10. A card shown in FIG. 1B includes a CPU 14 in addition to the memory 12. A card shown in FIG. 1C includes an I/O 16 in addition to the memory 12 and the CPU 14. A card shown in FIG. 2A includes a display section 20 and a display driver section 22 in addition to the components of the card shown in FIG. 1C. A card shown in FIG. 2B includes a power supply such as a solar battery 24 in addition to the components of the card shown in FIG. 2A. The configuration of the card may be modified variously. For example, a power supply such as the solar battery 24 may be provided to the cards other than the card shown in FIG. 2B.

A personal verification device 30 is provided to each of the cards shown in FIGS. 1A to 1C and FIGS. 2A and 2B.

Information Processing System

Figure 3:
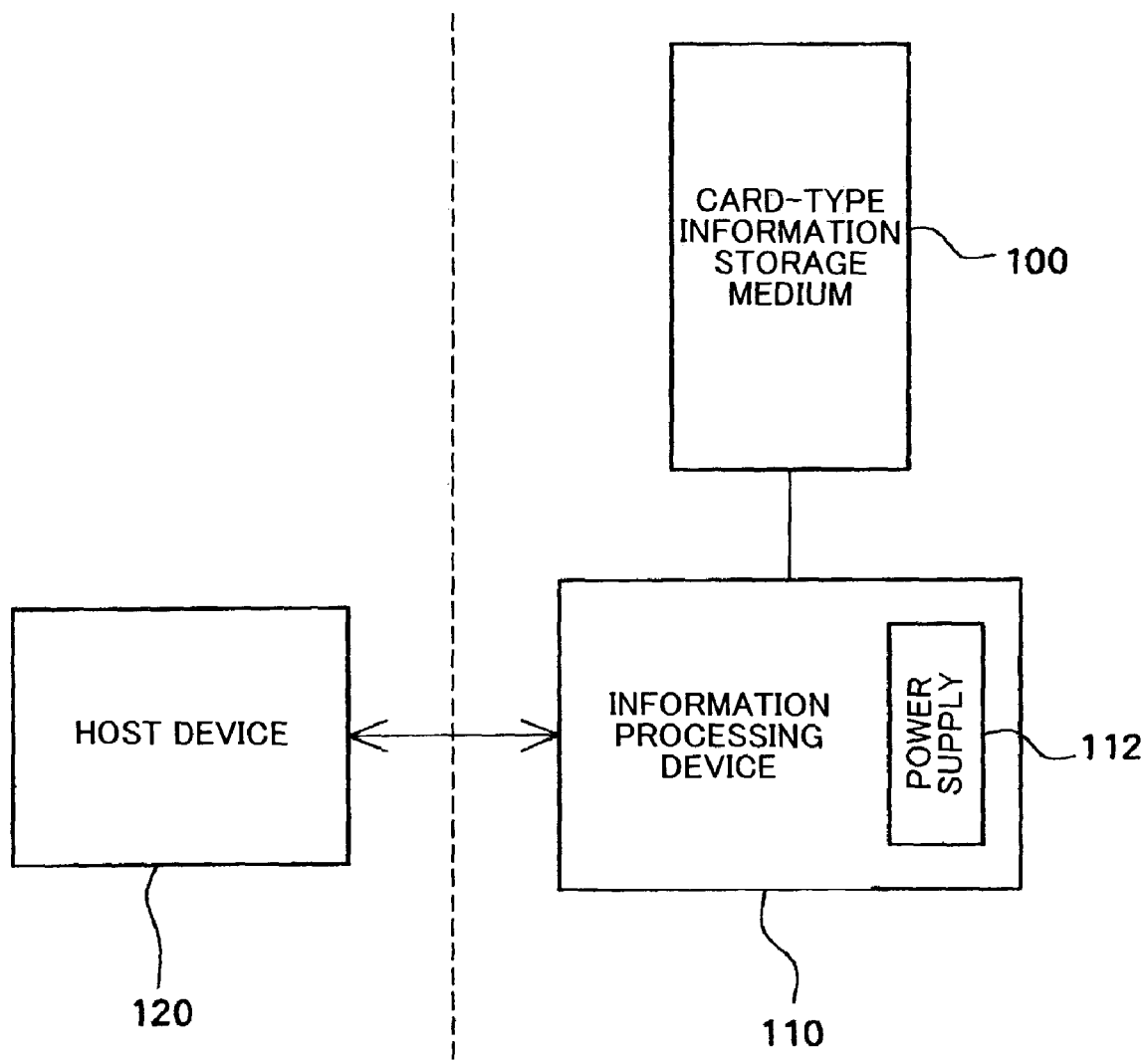
FIG. 3 is a block diagram of an information processing system including a card-type information storage medium and an information processing device according to one embodiment of the present invention.

FIG. 3 shows an information processing system including a card-type information storage medium 100 and an information processing device 110. When a cardholder touches a sensing region of the card-type information storage medium 100 in the present embodiment with the finger, the card-type information storage medium 100 detects a fingerprint and a pulse wave of the cardholder, and personal verification is carried out by the personal verification device 30. If the card-type information storage medium 100 includes a power supply, the verification operation may be carried out without receiving power from the information processing device 110. If the card-type information storage medium 100 does not include a power supply, the verification operation may be carried out by receiving power from a power supply section 112 of the information processing device 110.

If the cardholder is verified as the registered cardholder in the card-type information storage medium 100, the information processing device 110 reads various types of information other than the information used for personal verification from the card-type information storage medium 100, and processes the information. As an output form of the verification results from the card-type information storage medium 100, in the case where the card-type information storage medium 100 includes the display section 20 (see FIGS. 2A and 2B), information which allows the use of the card such as "available for use" may be displayed in the display section 20. An operator of the information processing device 110 may start information processing after confirming the display. If the card-type information storage medium is a credit card and includes a power supply, illegal use of the credit card is remarkably reduced merely by confirming the display information. Moreover, personal verification of the card user can be carried out even if the information processing device is not installed in the store. If the cardholder is verified as the true cardholder in the card-type information storage medium 100, a password or the like may be output from the card-type information storage medium 100 in the form of electronic information or the like and input to the information processing device 110. This enables the processing in the information processing device 110 to be started without allowing the operator to operate the information processing device 110. The information processing device 110 may function as a terminal device of a host device 120 of the card company, and have a function of checking the password output from the card-type information storage medium 100 based on information from the host device 120.

Since the card-type information storage medium 100 cannot be used by a person other than the true cardholder, illegal use of the card can be prevented even if the card is lost or stolen. Moreover, since the personal information such as the fingerprint and the pulse wave is not externally read from the card-type information storage medium 100, leakage of the personal information can be prevented.

Personal Verification Device

Figure 4:
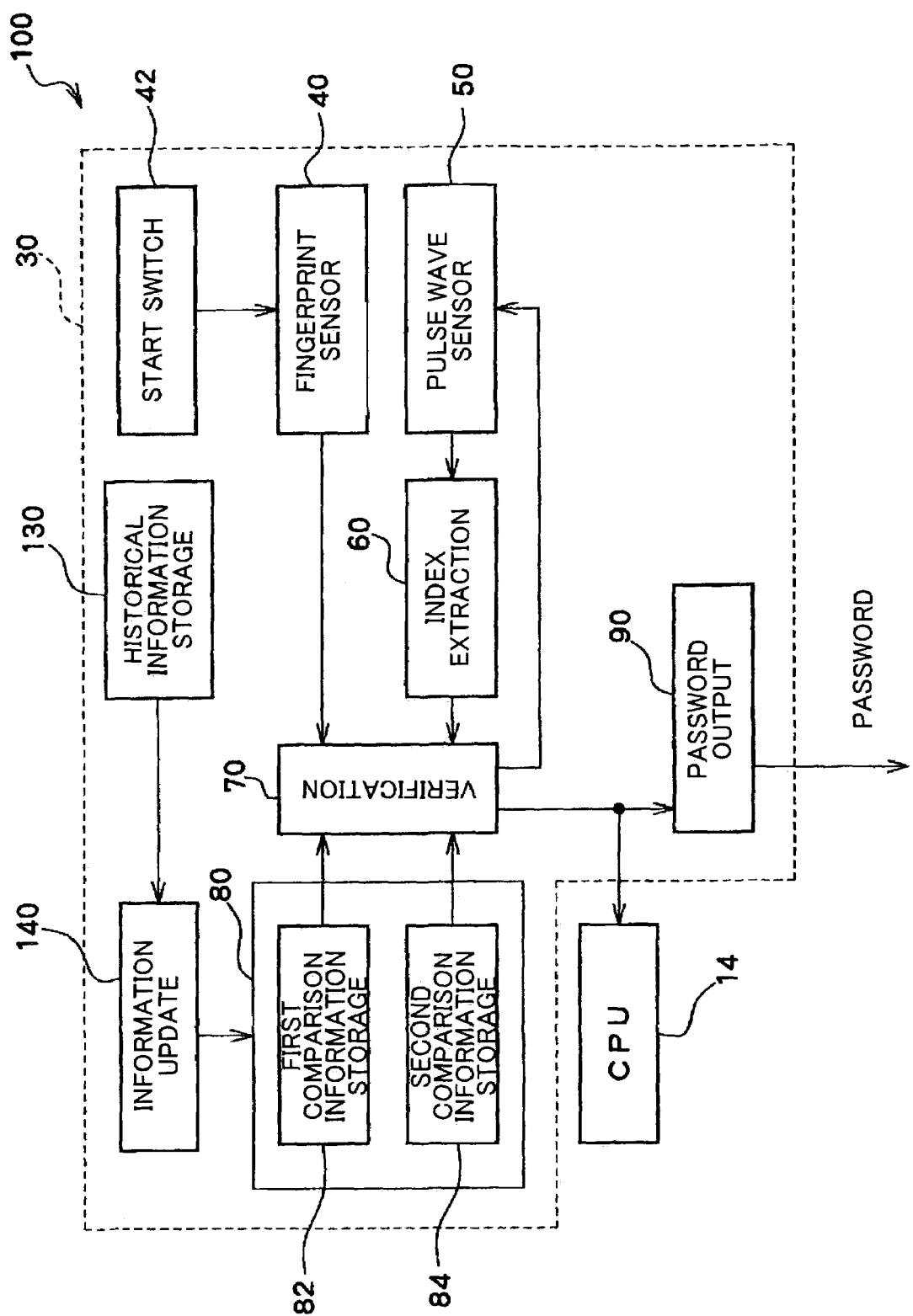
FIG. 4 is a block diagram of a personal verification device included in a card-type information storage medium according to one embodiment of the present invention.

FIG. 4 is a block diagram of the personal verification device 30 included in the card-type information storage medium 100. In FIG. 4, the personal verification device 30 includes a fingerprint sensor 40 as a first detection section which detects characteristic information of the cardholder, and a pulse wave sensor 50 as a second detection section which detects the pulse wave of the cardholder. Details of these sensors 40 and 50 are described later. The personal verification device 30 may include a start switch 42 which activates the personal verification device 30 by sensing that the cardholder touches the fingerprint sensor 40 with the finger. In particular, in the case where the card-type information storage medium 100 includes a power supply, it is effective to provide the start switch 42 from the viewpoint of energy saving.

The personal verification device 30 includes an index extraction section 60 which extracts at least one index by processing the pulse wave detected by the pulse wave sensor 50.

The fingerprint information detected by the fingerprint sensor 40 and the index extracted by the index extraction section 60 are input to a verification section 70. The verification section 70 compares reference information stored in a reference information storage section 80 with the detected information. The reference information storage section 80 includes a first reference information storage section 82 which stores first reference information which is compared with the fingerprint information detected by the fingerprint sensor 40, and a second reference information storage section 84 which stores second reference information which is compared with the index extracted by the index extraction section 60. The personal verification device 30 includes a password output section 90 which outputs a signal such as an encrypted password which allows the use of the card since the cardholder is true, based on the verification results from the verification section 70. The signal output from the verification section 70 is also input to the CPU 14 of the card-type information storage medium 100. The CPU 14 controls so that the display section 20 shown in FIGS. 2A and 2B displays notification to the effect that the use of the card is allowed such as a message "available for use", or performs a lighting or flashing operation to the same effect.

The personal verification device 30 further includes a historical information storage section 130 which stores previously extracted information, and an information update section 140. The historical information storage section 130 stores the extracted information which has been verified as information of the cardholder. The information update section 140 updates the extracted information with the latest information based on the extracted information which has been verified as information of the cardholder. This enables the allowable range of the second reference information to be determined. The allowable range is stored in the second reference information storage section 84.

Pulse Wave Sensor and Index Extraction Section

The pulse wave sensor 50 may be formed by using a piezoelectric sensor. In the present embodiment, an example of optically detecting the pulse wave is described below. In this case, the pulse wave sensor 50 may be formed by using a light emitting element (light emitting diode, surface-emitting laser, organic EL device, or the like) and a light receiving element (photodiode, phototransistor, or the like). The size and cost of the pulse wave sensor 50 can be reduced by forming these elements monolithically.

The emission wavelength of the light emitting element is preferably selected near the peak of the absorption wavelength of the hemoglobin in blood. Since the light receiving level is changed depending on the blood flow, the waveform of the pulse wave (plethysmogram, for example) can be detected. As the light emitting element, an InGaN (indium-gallium-nitrogen) blue LED or the like may be used. The emission wavelength of the light emitting element is 350 to 600 nm (peak wavelength is about 450 nm). As the light receiving element, a GaAsP (gallium-arsenic-phosphorus) phototransistor or the like may be used. The major sensitivity region of the light receiving element is 300 to 600 nm. Light at a wavelength of 700 nm or less contained in external light is rarely transmitted by the tissue of the finger. Therefore, a high S/N ratio can be secured even if the pulse wave is detected in a state in which the finger is in contact with the card.

The pulse wave sensor 50 may have a structure disclosed in Japanese Patent Application Laid-open Nos. 9-27611 and 11-330532 applied for by the applicant of the present invention, so that the pulse wave sensor 50 is incorporated into the card-type information storage medium 100. In these applications, a pulse wave sensor is formed by forming a surface-emitting semiconductor laser as a light emitting device and a photodiode as a light receiving element on a substrate by using a semiconductor manufacturing process so that the pulse wave sensor is adjacent to the photodiode and is electrically insulated from the photodiode. The thin film pulse wave sensor 50 having the above emission wavelength and reception wavelength may be formed by using the above structure and appropriately selecting the materials.

Figure 5:
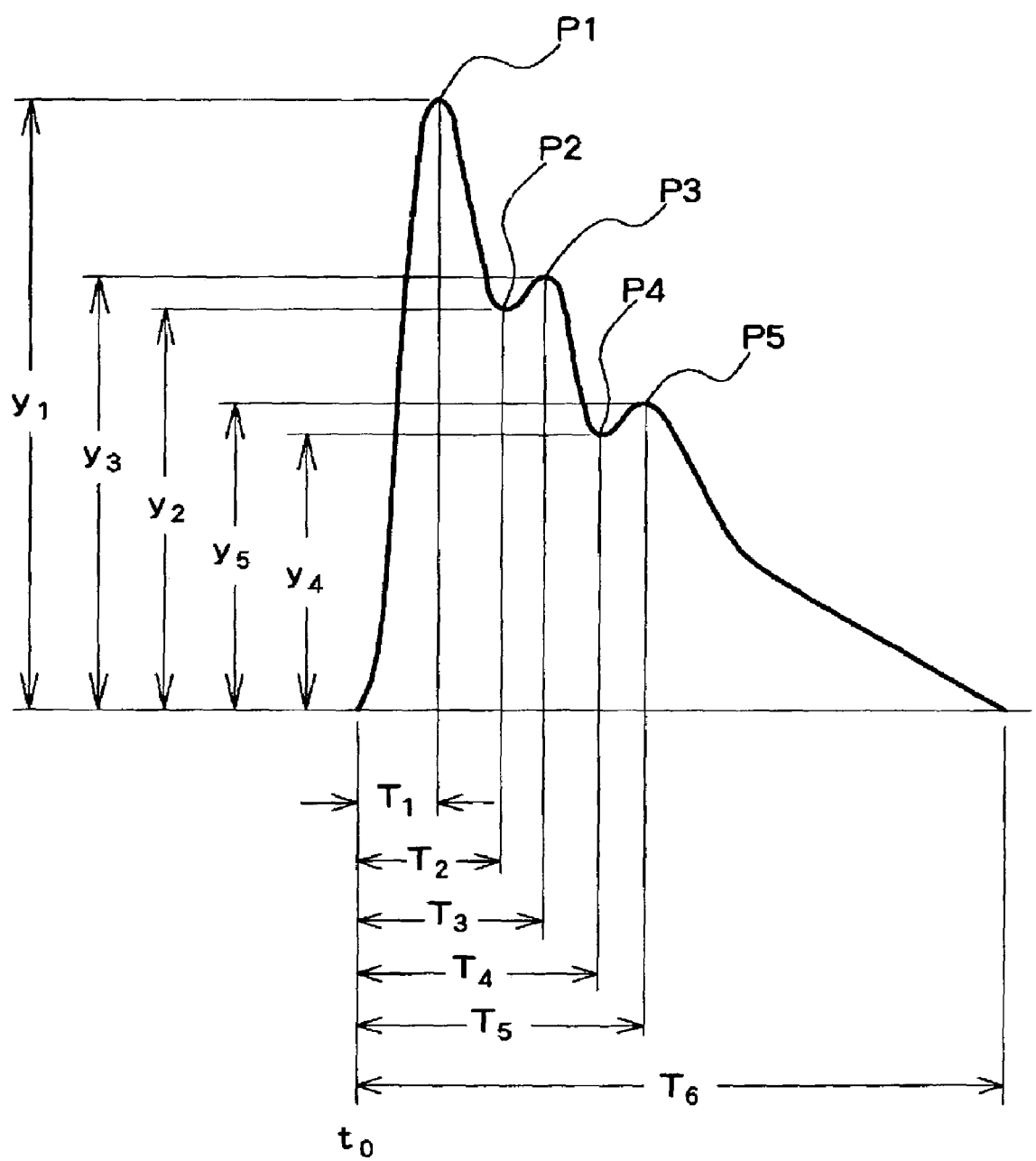
FIG. 5 is a waveform chart showing features of a pulse waveform for one pulse.

FIG. 5 shows a pulse waveform for one pulse detected by the pulse wave sensor 50. As shown in FIG. 5, this pulse wave has the following features.

(1) Inflection points P1 to P5 sequentially appear in the pulse wave for one pulse.

(2) The inflection points P1 to P5 respectively have wave heights y1 to y5.

(3) Time elapsed before each of the inflection points P1 to P5 appears is respectively T1 to T5 and time (cycle) elapsed before the next pulse wave for one pulse starts is T6 based on a pulse wave start time t0.

In the present embodiment, the index extraction section 60 may extract at least one of the wave heights y1 to y5 of the inflection points P1 to P5, or at least one of the times T1 to T5 elapsed before the inflection points P1 to P5 appear from the time t0 and the cycle T6.

The pulse wave is a biological signal generated from a living body, and an index extracted by processing the pulse wave is characteristic of a living body. Therefore, if such an index can be extracted, it is confirmed that a finger of a live cardholder is monitored instead of a severed finger. In the case where a pulse (cycle) which is a component of the pulse wave is directly detected instead of the pulse wave, such a pulse can be generated artificially. In the present embodiment, the pulse wave which rarely allows counterfeiting is detected, and the index extracted by processing the pulse wave is compared with the reference information. Therefore, illegal use of the card can be positively prevented.

Figure 6:
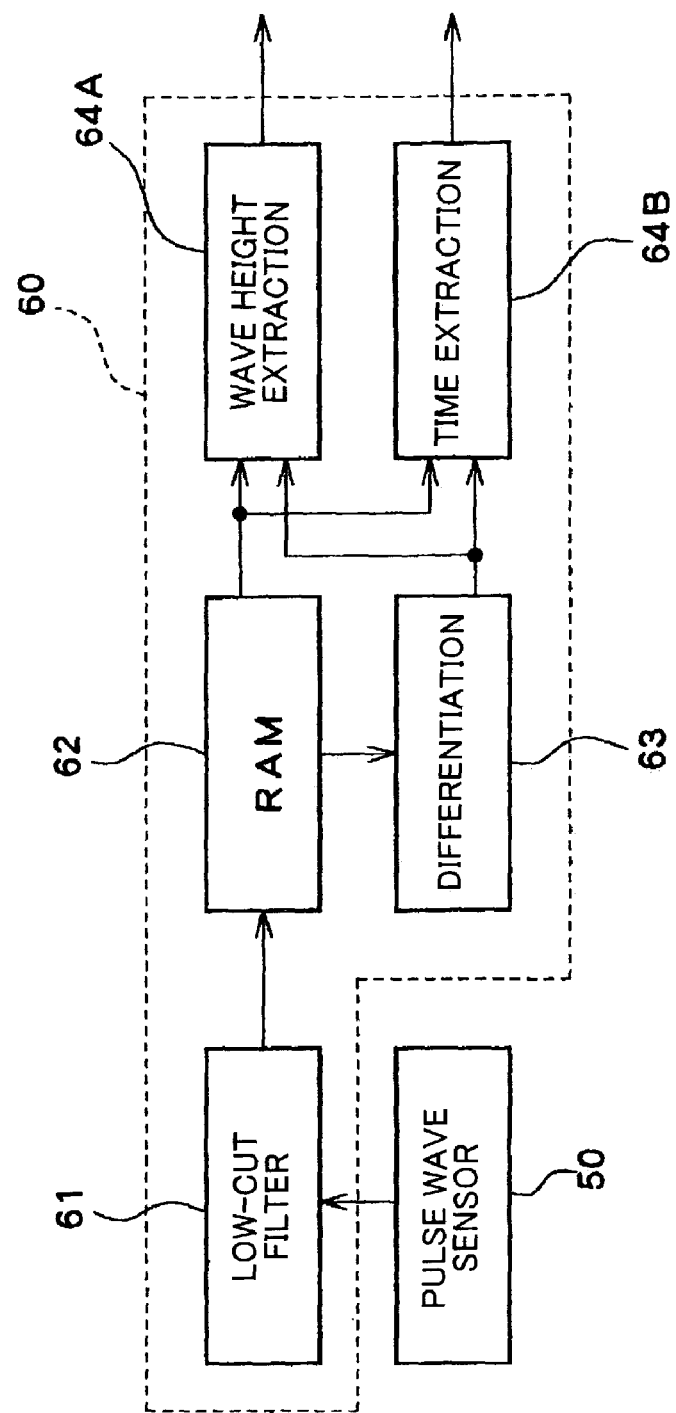
FIG. 6 is a block diagram showing an example of an index extraction section which extracts indices relating to a plurality of inflection points shown in FIG. 5.

The above-described index may be extracted by the index extraction section 60 shown in FIG. 6. A low-cut filter 61 cuts off frequencies of the pulse wave detected by the pulse wave sensor 50 which are lower than a given cut-off frequency, and allows only frequencies above the given cut-off frequency to pass. The cut-off low frequency band contains components which reflect autonomic nervous functions such as variation caused by respiration (0.15 Hz, for example) which is a parasympathetic nervous function, and a Mayer wave (0.1 Hz, for example) of a muscle pump effect which is a sympathetic nervous function. The low frequency band also contains frequency components accompanied by body movement. The low-cut filter 61 is capable of removing an unnecessary low frequency band which impairs the pulse waveform based on the pulse.

It is preferable that the low-cut filter 61 have a cut-off frequency in the range of 0.4 to 0.5 Hz. This is because features of the pulse waveform based on the pulse are lost if the frequencies above 0.4 to 0.5 Hz are cut.

A RAM 62 functions as a working memory and stores output of the low-cut filter 61. A differentiation circuit 63 calculates the time derivative of the waveform output from the low-cut filter 61. Points at which 0 is output as the derivative correspond to the inflection points P1 to P5. A wave height extraction section 64A extracts at least one of the wave heights y1 to y5 of the inflection points P1 to P5 corresponding to the derivative 0 output from the differentiation circuit 63 as an index from the waveform stored in the RAM 62. A time extraction section 64B extracts at least one of the times T1 to T5 at which the inflection points P1 to P5 appear as an index. Only one of the wave height extraction section 64A and the time extraction section 64B may be provided.

Figure 7:
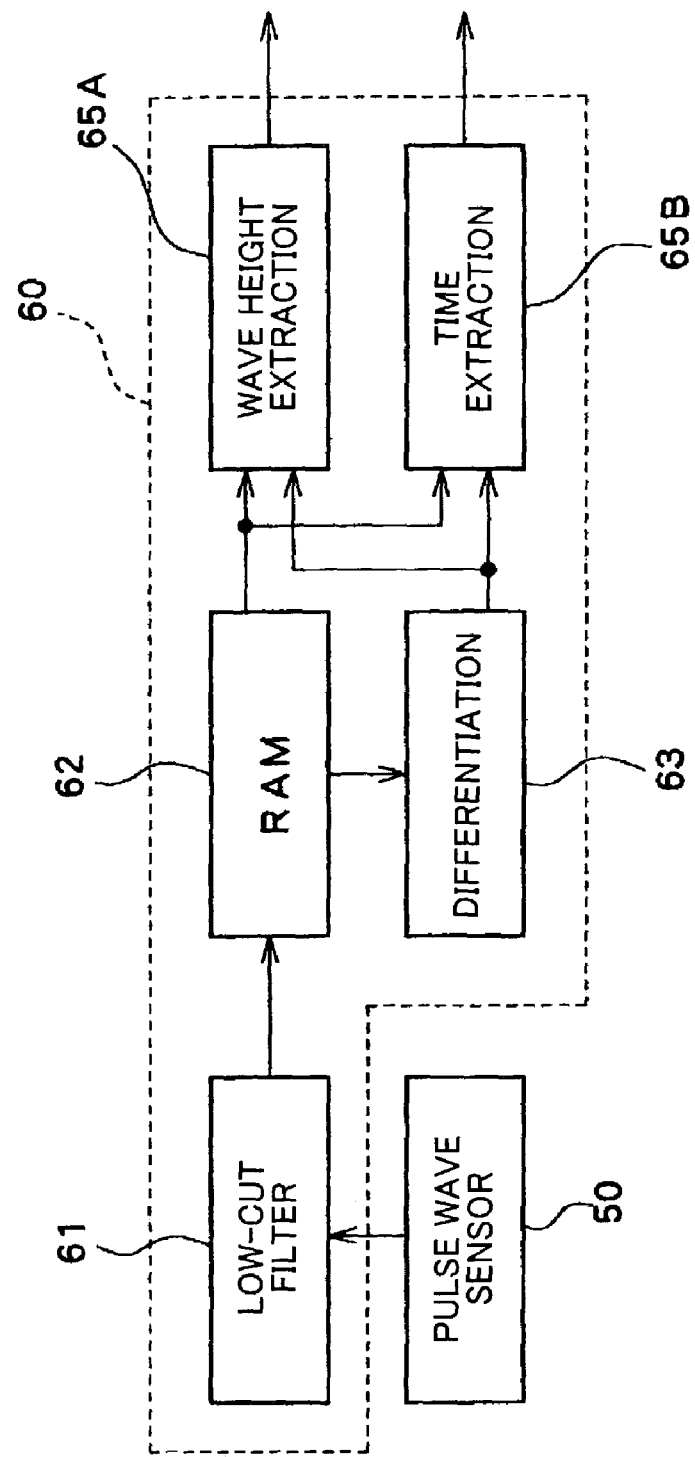
FIG. 7 is a block diagram showing another example of an index extraction section which extracts indices relating to the inflection points shown in FIG. 5.

The index extraction section 60 shown in FIG. 7 may be used instead of the index extraction section 60 shown in FIG. 6. In FIG. 7, a wave height ratio extraction section 65A is provided instead of the wave height extraction section 64A, and a time ratio extraction section 65B is provided instead of the time extraction section 64B. The wave height ratio extraction section 65A calculates at least one of wave height ratios of an arbitrary two of the wave heights y1 to y5, such as y2/y1, y3/y1, y4/y1, and y5/y1, as an index. The time ratio extraction section 65B calculates at least one of time ratios of an arbitrary two of the times T1 to T6, such as T1/T6, T2/T6, T3/T6, T4/T6, and T5/T6, as an index. In particular, the time T2 or T4 is called an ejection time, and the time ratio T2/T6 or T4/T6 is suitable as the index which represents a living body. There may be a case where a peak P2 corresponding to the original ejection time T2 does not appear due to individual variation or physical conditions. In this case, since a peak P4 appears earlier, the time T4 at which the peak P4 appears may be employed as the ejection time. Only one of the wave height ratio extraction section 65A and the time extraction section 65B may be provided. Since the relative value in the pulse waveform can be determined by using such a ratio as the index, verification accuracy is increased in comparison with the case of using the wave height or time as the index.

Figures 8A, 8B, 8C:
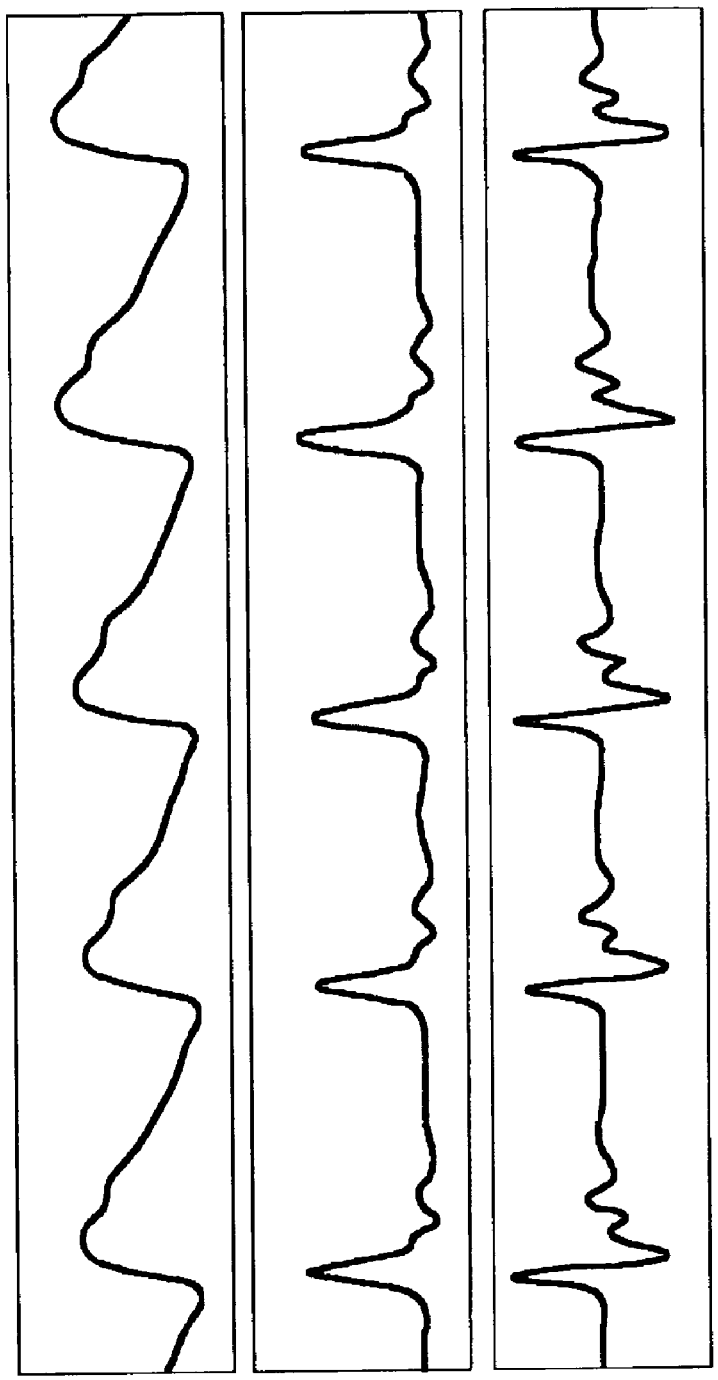
FIG. 8A is a waveform chart showing an original waveform of a detected pulse wave.
FIG. 8B is a waveform chart showing a velocity waveform of FIG. 8A.
FIG. 8C is a waveform chart showing an acceleration waveform of FIG. 8A.
Figure 9:
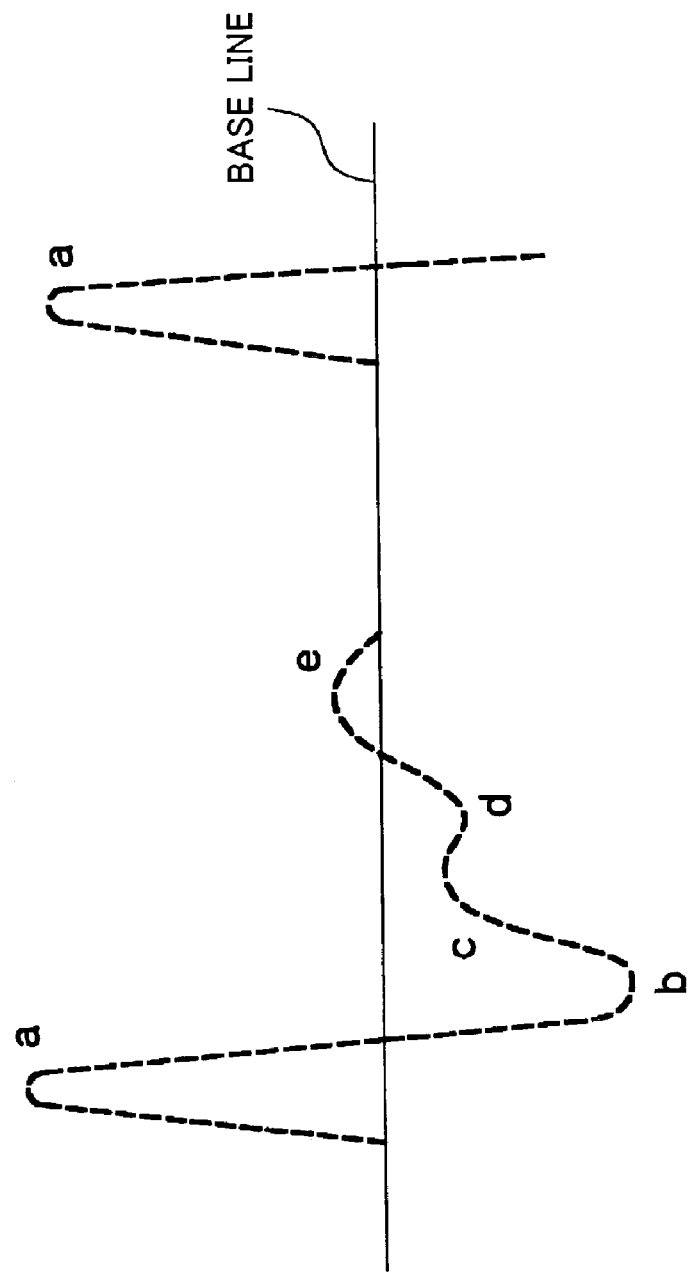
FIG. 9 is a schematic diagram for illustrating features of an acceleration waveform.

FIG. 8A is a waveform diagram showing a detected original pulse waveform. FIG. 8B is a waveform diagram showing a velocity waveform (first derivative waveform) of FIG. 8A. FIG. 8C is a waveform diagram showing an acceleration waveform (second derivative waveform) of FIG. 8A. As shown in FIG. 9, the acceleration waveform shown in FIG. 8C has more definite inflection points a to e. Therefore, a wave height ratio of an arbitrary two of the inflection points a to e in the acceleration waveform may be utilized as an index.

A wave height ratio b/a of the first minimum point b to the first maximum point a which appear in the second derivative waveform of the pulse wave, c/a, d/a, e/a, and the like are indices which change depending on age. Of these, since age dependence of the wave height ratios b/a and d/a is conspicuous, the wave height ratios b/a and d/a are suitable as the indices of the cardholders at various ages. As a result, verification accuracy is increased. Some of these indices reflect the sex and may be utilized for a sex check.

Figure 10:
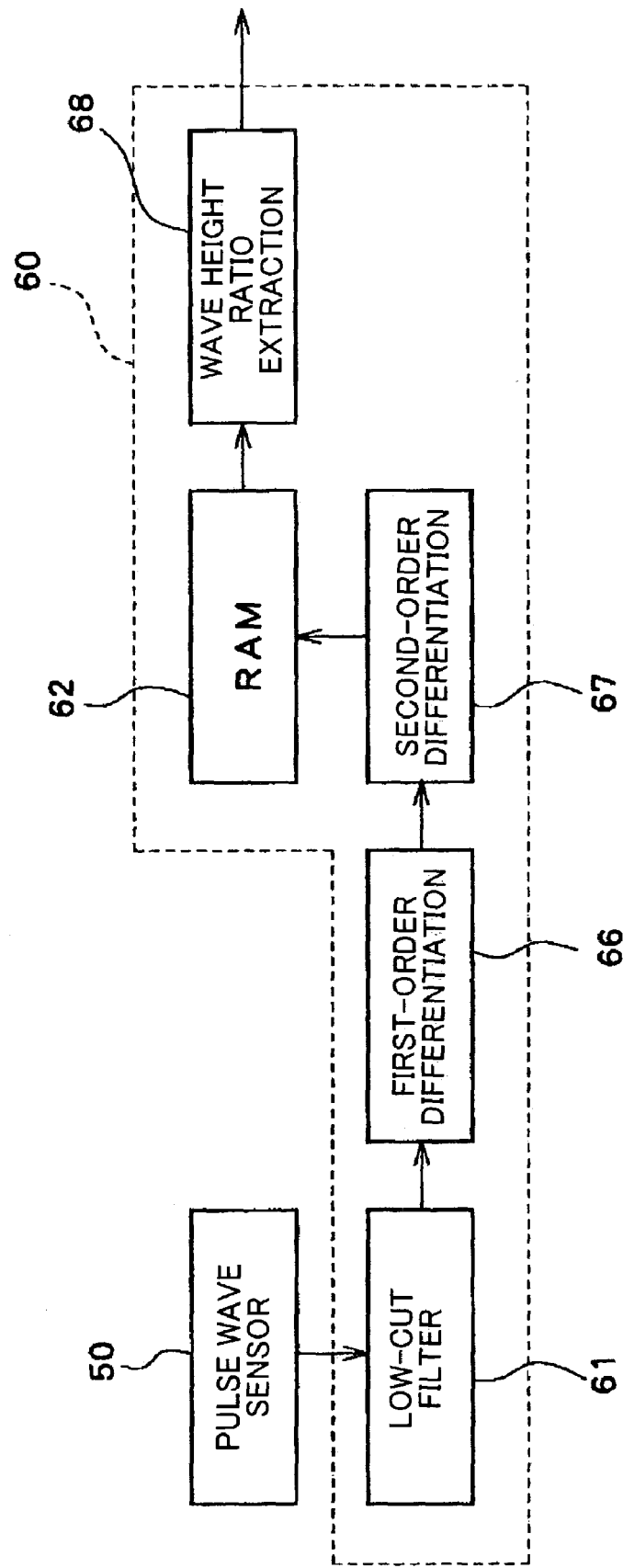
FIG. 10 is a block diagram showing an index extraction section which extracts a wave height ratio of a plurality of inflection points in the acceleration waveform shown in FIG. 8C as an index.

The wave height ratio can be extracted by the index extraction section 60 shown in FIG. 10. As shown in FIG. 10, the pulse wave detected by the pulse wave sensor 50 is allowed to pass through the low-cut filter 61, first-order differentiated by the first-order differentiation circuit 66, second-order differentiated by the second-order differentiation circuit 67, and stored in the RAM 62. The wave height ratio extraction section 68 extracts the wave height ratio b/a from the second derivative waveform (acceleration waveform shown in FIG. 9) stored in the RAM 62, for example.

Another example of the index is given below. The vascular bed inside the skin of the cardholder is present in the light transmission path between the light emitting element and the light receiving element of the pulse wave sensor 50. Therefore, the output signal of the pulse wave sensor 50 must be amplified. For example, the output signal may be amplified by using an automatic gain control (AGC) function so that an amplitude level equal to or more than a given level is obtained within the dynamic range of an A/D converter. The amplification factor set by the AGC function can be a personal index equivalent to the vascular age.

In this case, the amplifier which amplifies the output of the pulse wave sensor 50 functions as an index extraction section which amplifies the pulse wave and extracts the amplification factor as an index.

Operation of Personal Verification Device

Figure 11:
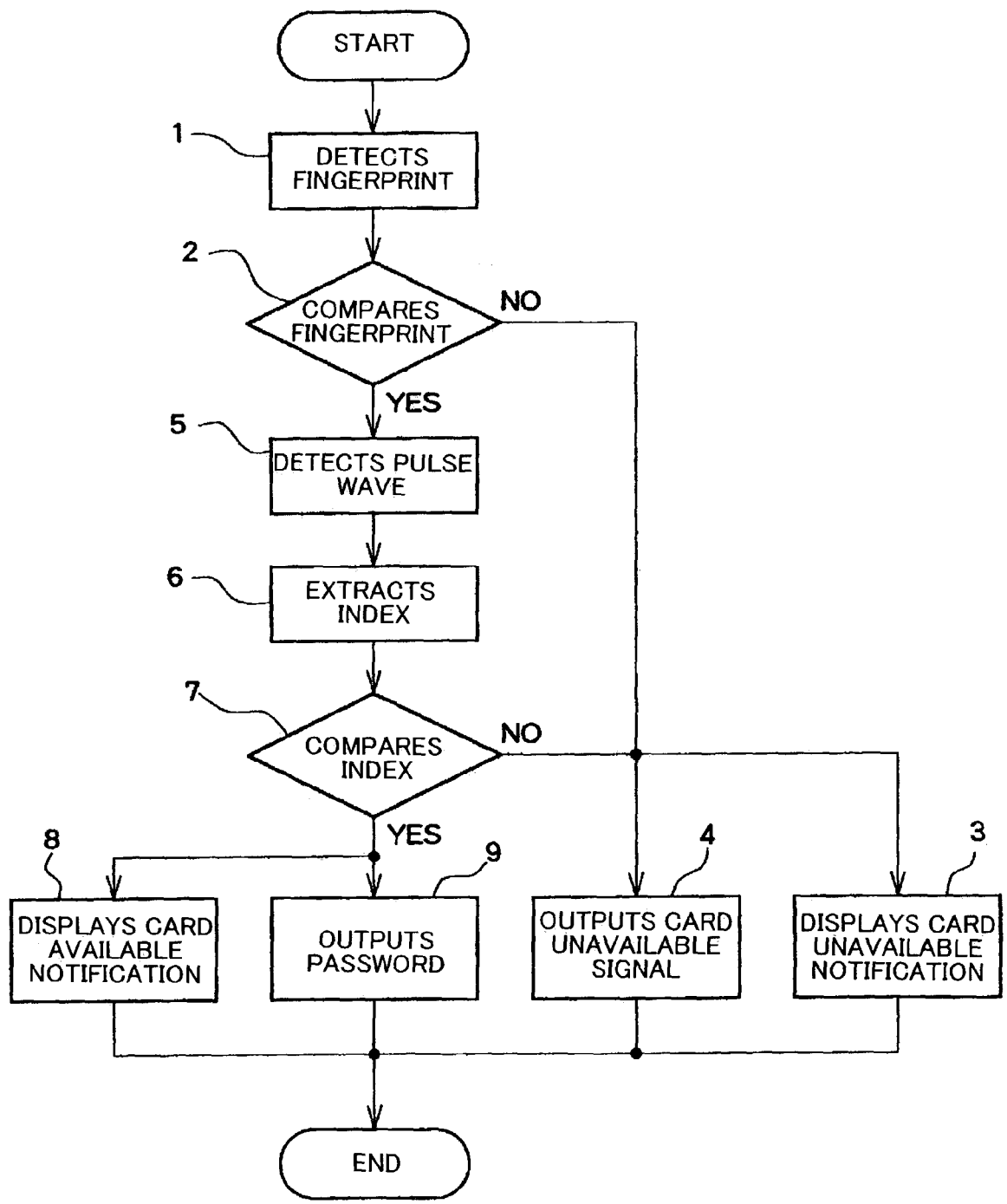
FIG. 11 is a timing chart of an operation of a personal verification device shown in FIG. 4.

FIG. 11 is a flowchart of the operation of the personal verification device 30. In the present embodiment, fingerprint information is detected by the fingerprint sensor 40 (step 1). In the case where the card-type information storage medium 100 includes a power supply, the detection operation of the fingerprint information may be carried out merely by the card-type information storage medium 100 without connecting the card-type information storage medium 100 with the information processing device 110 shown in FIG. 4. Irrespective of whether or not the card-type information storage medium 100 includes a power supply, the fingerprint may be detected by connecting the card-type information storage medium 100 with the information processing device 110 shown in FIG. 3 and supplying power to the card-type information storage medium 100 from the power supply section 112 of the information processing device 110.

The detected fingerprint information is input to the verification section 70. The first reference information which is compared with the fingerprint information is input to the verification section 70 from the first reference information storage section 82 of the reference information storage section 80. The fingerprint information is compared with the first reference information by the verification section 70. The first reference information is fingerprint information characteristic of the registered cardholder. Therefore, if the cardholder is the true cardholder registered in the card, the verification section 70 judges that the first reference information coincides with the fingerprint information (YES in step 2).

If the judgment result is NO in the step 2, it is estimated that the true cardholder is not operating the card. Therefore, the verification section 70 outputs an inconsistency signal. In the case where the card-type information storage medium 100 includes the display section 20 (see FIGS. 2A and 2B), the inconsistency signal is input to the CPU 14 shown in FIGS. 2A and 2B. The CPU 14 controls the display driver section 22 so that the display section 20 displays notification to the effect that the card cannot be used such as characters "unavailable" (step 3). The inconsistency signal is also input to the password output section 90. The password output section 90 outputs a signal to the effect that the card cannot be used because the cardholder is not true instead of the password (step 4). This forbids the use of the card-type information storage medium 100.

If the fingerprint information does not coincide with the first reference information, the subsequent verification operation is not carried out. The fingerprint is detected while consuming a small amount of power by using a capacitance detection principle as described later, for example. However, a comparatively large amount of power is consumed by optically detecting the pulse wave as described above. Therefore, the pulse wave detection operation which consumes a large amount of power is not carried out if the fingerprint information does not coincide with the first reference information.

If the judgment result is YES in the step 2, the pulse wave sensor 50 starts sensing the pulse wave based on a coincidence signal from the verification section 70, whereby the pulse wave is detected (step 5). The index extraction section 60 extracts at least one of the above-described various indices (step 6). The extracted index and the second reference information from the second reference information storage section 84 of the reference information storage section 80 are input to the verification section 70. The verification section 70 compares the index with the second reference information (step 7). The second reference information is an index of the pulse wave of the registered cardholder. Therefore, if the extracted index is the index of the registered cardholder, the verification section 70 judges that the index coincides with the second reference information (YES in step 7). The second reference information is stored with an allowable width. If the extracted index is within the allowable width, the index is judged to coincide with the second reference information.

The pulse wave is a biological signal generated from a living body, and an index extracted by processing the pulse wave is characteristic of a living body. Therefore, if such an index coincides with the stored information, it is confirmed that the pulse wave is obtained by monitoring a finger of a live cardholder. An age check and/or a sex check may be carried out depending on the index in order to reflect the age, sex, and the like of the registered cardholder.

If the judgment result is NO in the step 7, the step 3 and/or the step 4 is carried out, whereby illegal use of the card can be prevented.

If the judgment result is YES in the step 7, it is judged that the true, live cardholder is operating the card. Therefore, the verification section 70 outputs the coincidence signal. In the case where the card-type information storage medium 100 includes the display section 20, the coincidence signal is input to the CPU 14 shown in FIGS. 2A and 2B. The CPU 14 controls the display driver section 22 so that the display section 20 displays notification to the effect that the card can be used, such as characters "available for use" (step 8). The coincidence signal is also input to the password output section 90, and the password output section 90 outputs the password (step 9). The password may be output as either electronic information or display information. If the password is output as electronic information, the electronic information directly communicates with the host device 120 on-line, and verification of the password is carried out in the host device 120. If the password is output as display information using numbers such as "0689093", an operator inputs the display information to the information processing device 110, and the information processing device 110 communicates with the host device 120. The verification operation in the card-type information storage medium 100 is thus completed.

Historical Information Storage Section and Information Update Section

As shown in FIG. 4, the personal verification device 30 may further include the historical information storage section 130 which stores the historical information on the index extracted by the index extraction section 60, and the information update section 140 which updates the second reference information stored in the second reference information storage section 82 of the reference information storage section 80 based on the historical information.

Figure 17:
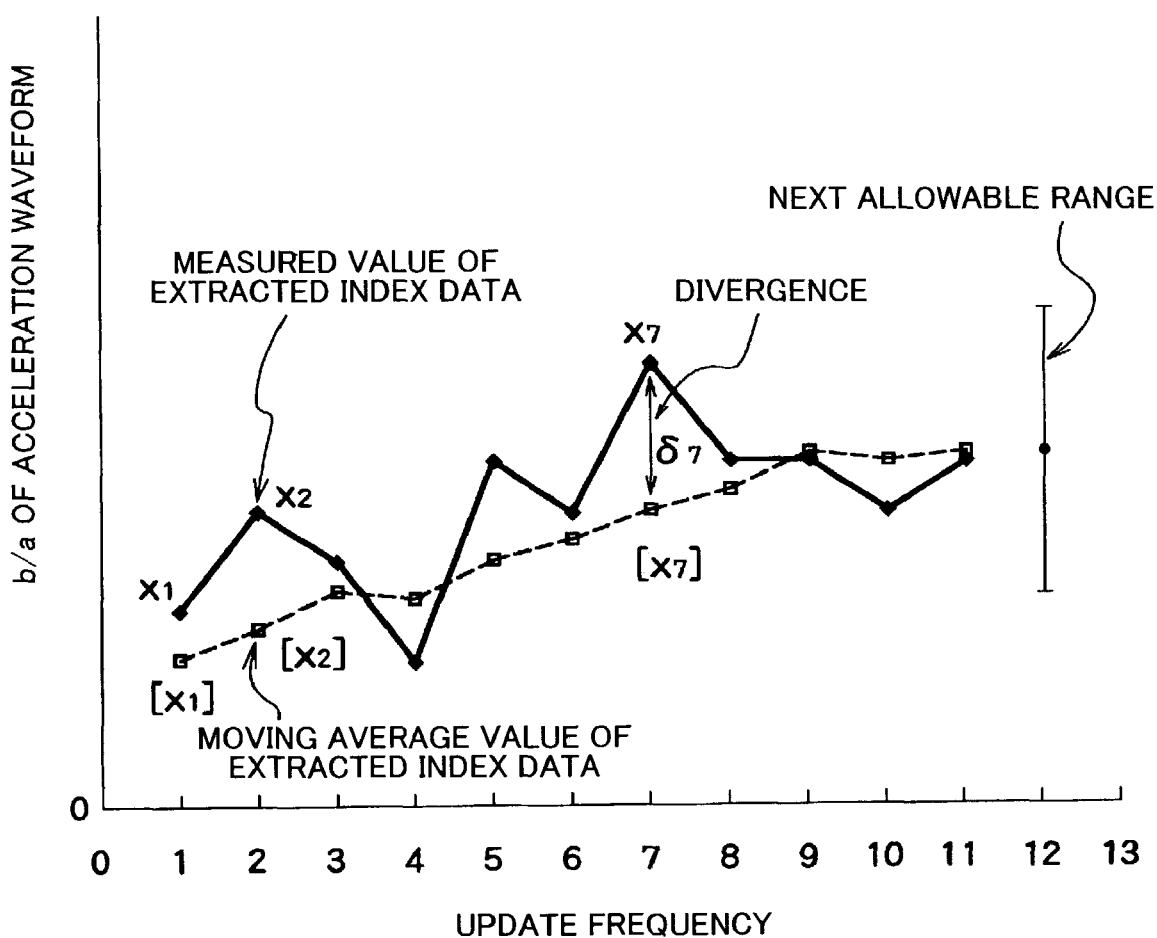
FIG. 17 is a characteristic diagram showing the relationship between index data $X_i$ which is determined to coincide with reference information in a step 7 shown in FIG. 11 and a moving average $[X_i]$ of the index data $X_i$.

Some of the indices extracted from the pulse wave change with time, such as age dependent indices as described above. Therefore, if a constant index is always stored as the second reference information, the index differs from the index of the cardholder as time elapses. Therefore, the extracted index is stored in the historical information storage section 130 as the historical information each time the index is judged to coincide with the second reference information (YES in step 7). A plurality of previously detected indices is stored in the historical information storage section 130 as the historical information, for example. The information update section 140 calculates a moving average value and a deviation of the previously detected indices based on the historical information, for example. The information update section 140 determines the next allowable range from these values, and updates the second reference information with the next allowable range. As shown in FIG. 17, provided that the extracted index data which is judged to coincide with the second reference information in the index comparison step 7 shown in FIG. 11 (YES in step 7) in the i-th use is $X_i$, a moving average value/$X_i$ is an average value of N extracted index data from the (i−N+1)th extracted index data $X_{i-N+1}$ to the i-th extracted index data $X_i$.

$$/X_i \equiv \frac{1}{N} \sum_{j=i-N+1}^{i} X_j$$

N is an integer equal to or larger than two. It is preferable that N be about 5 to 25 since the amount of data is not excessively increased and a smooth moving average value can be obtained. Then, a divergence $\delta_i$ between the measured value $X_i$ of each of the extracted index data and the moving average value/$X_i$ corresponding thereto is calculated.

$$\delta_i = X_i - /X_i$$

The N mean square value of the divergence is called variance $\sigma_i^2$.

$$\sigma_i^2 = \frac{1}{N} \sum_{j=i-N+1}^{i} \delta_j^2 = \frac{1}{N} \sum_{j=i-N+1}^{i} (X_j - /X_j)^2$$

The square root of the variance $\sigma_i^2$ is a moving deviation $\sigma_i$.

$$\sigma_i = \sqrt{\frac{1}{N} \cdot \sum_{j=i-N+1}^{i} (X_j - /X_j)^2}$$

A regression approximation curve is drawn with respect to the moving average value of the previously measured values, and the next moving average value $[X]_{i+1}$ is estimated from the approximation curve. As the type of regression, linear approximation, logarithmic approximation, polynomial approximation, exponential approximation, index approximation, or the like is used. Of these, linear approximation is optimal since approximation is easily performed with a small amount of calculation. In this case, linear approximation is performed from the moving average value of the latest m measured values including the present moving average value/$X_i$. It is preferable to perform linear approximation by using the present moving average value/$X_i$ and the last but one moving average value/$X_{i-2}$.

$$[X]_{i+1} = /X_i + \frac{/X_i - /X_{i-2}}{2}$$

The allowable range of the next biological information is determined by using the moving deviation $\sigma_i$ calculated in advance and the next moving average estimated value $[X]_{i+1}$. The lower limit $L_{i+1}$ of the allowable range is obtained by subtracting a value k ($1 \leq k \leq 3$) times as many as the moving deviation $\sigma_i$ from the next moving average estimated value $[X]_{i+1}$.

$$L_{i+1} = [X]_{i+1} - k\sigma_i$$

The upper limit $U_{i+1}$ of the allowable range is obtained by adding a value k ($1 \leq k \leq 3$) times as many as the moving deviation $\sigma_i$ to the next moving average estimated value $[X]_{i+1}$.

$$U_{i+1} = [X]_{i+1} + k\sigma_i$$

The allowable range of the next extracted index data is determined between $U_{i+1}$ and $L_{i+1}$. This allowable range becomes the updated second reference information. The value for k is suitably about 1-3. If k is greater than 1, the possibility of rejecting the true cardholder can be reduced. If k is smaller than 3, the possibility of mistaking another person for the cardholder can be reduced. The ideal value for k is 1.5 or more but 2.5 or less. If the measured value $X_{i+1}$ of the next extracted index data is between $L_{i+1}$ and $U_{i+1}$, specifically, if the relational equation $[X]_{i+1} - k\sigma_i \leq X_{i+1} \leq [X]_{i+1} + k\sigma_i$ is satisfied, the index data is judged to coincide with the second reference information (YES in step 7) in the index comparison step shown in FIG. 11 in the (i+1)th use (see FIG. 17).

This allows the second reference information which is compared with the index to be updated with the latest information. Therefore, verification errors can be reduced.

Fingerprint Sensor

Figure 12:
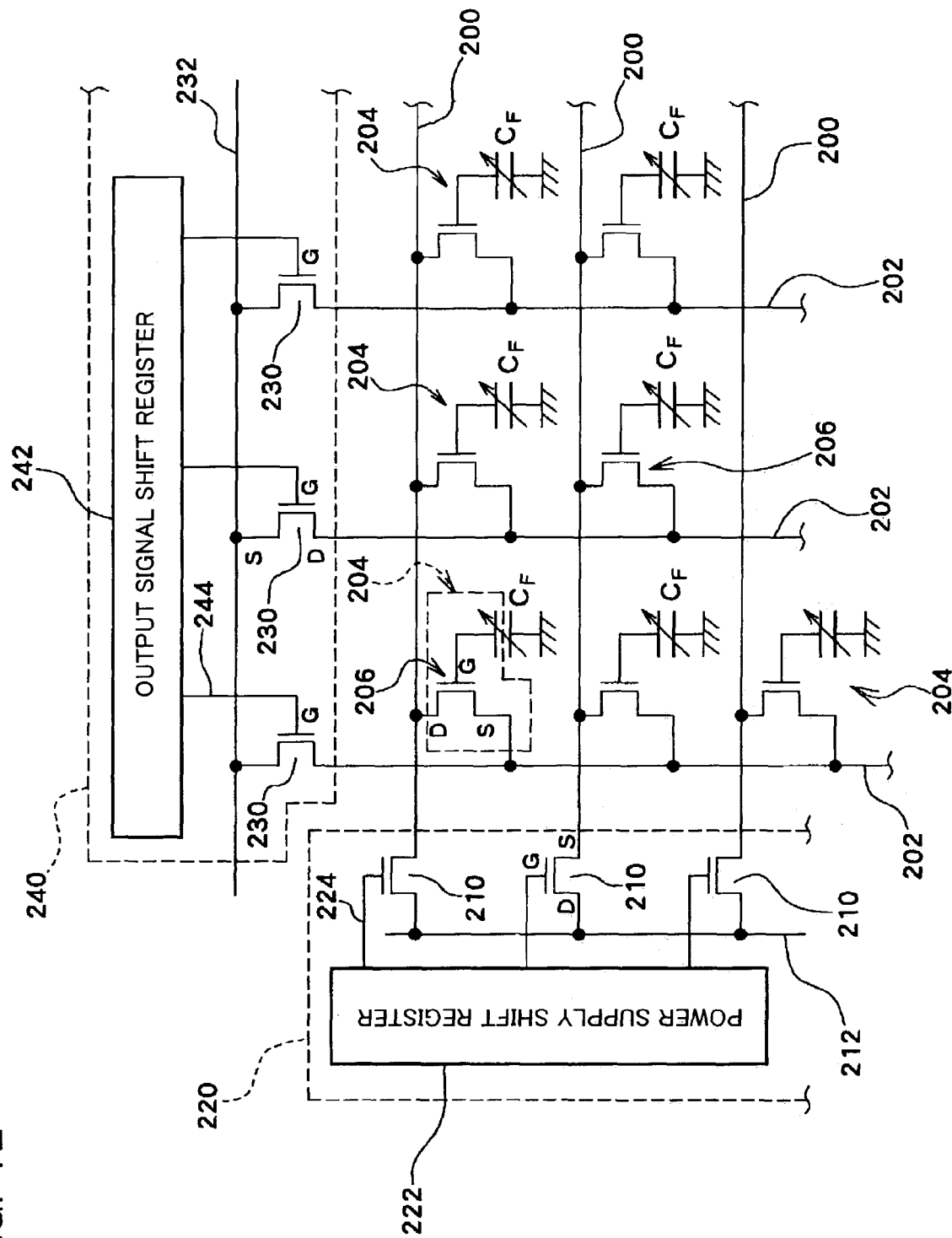
FIG. 12 is a schematic diagram for illustrating a fingerprint sensor.

FIG. 12 shows an example of the fingerprint sensor 40. The fingerprint sensor 40 is the same as the fingerprint sensor disclosed in Japanese Patent Application No. 2002-58071 applied for by the applicant of the present invention. In FIG. 12, the fingerprint sensor 40 includes M (M is an integer equal to or larger than two) power supply lines 200, and N (N is an integer equal to or larger than two) output lines 202. Capacitance detection elements 204 are provided at each intersecting point of the M power supply lines 200 and the N output lines 202. The capacitance detection element 204 shown in FIG. 12 is illustrated as a closed circuit when a finger is in contact with the capacitance detection element 204. The capacitance detection element 204 includes a variable capacitor $C_F$ of which the capacitance is changed depending on a ridge/valley pattern of a finger, and a signal amplification element such as a signal amplification MIS thin film semiconductor device (hereinafter abbreviated as "signal amplification TFT") 206. When a finger is not in contact with the capacitance detection element 204, a grounding terminal of the variable capacitor $C_F$ is in an open state. The variable capacitor $C_F$ is described later.

Each of the M power supply lines 200 is connected with drains D of the N signal amplification TFTs 206 arranged along the corresponding row. Each of the M power supply lines 200 is connected with a common power supply line 212 through each of M power supply pass gates 210. Specifically, the power supply pass gate 210 is formed by using a MIS thin film semiconductor device. A source S of the power supply pass gate 210 is connected with the power supply line 200, and a drain D of the power supply pass gate 210 is connected with the common power supply line 212. A power supply shift register 222 is provided to a power supply select circuit 220 in addition to the M power supply pass gates 210 and the common power supply line 212. A gate G of each of the M power supply pass gates 210 is connected with a power supply select output line 224 of the power supply shift register 222.

Each of the N output lines 202 is connected with sources S of the: M signal amplification TFTs 206 arranged along the corresponding column. Each of the N output lines 202 is connected with a common output line 232 through each of N output signal pass gates 230. Specifically, the output signal pass gate 230 is formed by using an MIS thin film semiconductor device. A drain D of the output signal pass gate 230 is connected with the output line 202, and a source S of the output signal pass gate 230 is connected with the common output line 232. An output signal shift register 242 is provided to an output signal select circuit 240 in addition to the N output signal pass gates 230 and the common output line 232. A gate G of the output signal pass gate 230 is connected with an output select output line 244 of the output signal shift register 242.

Figure 13:
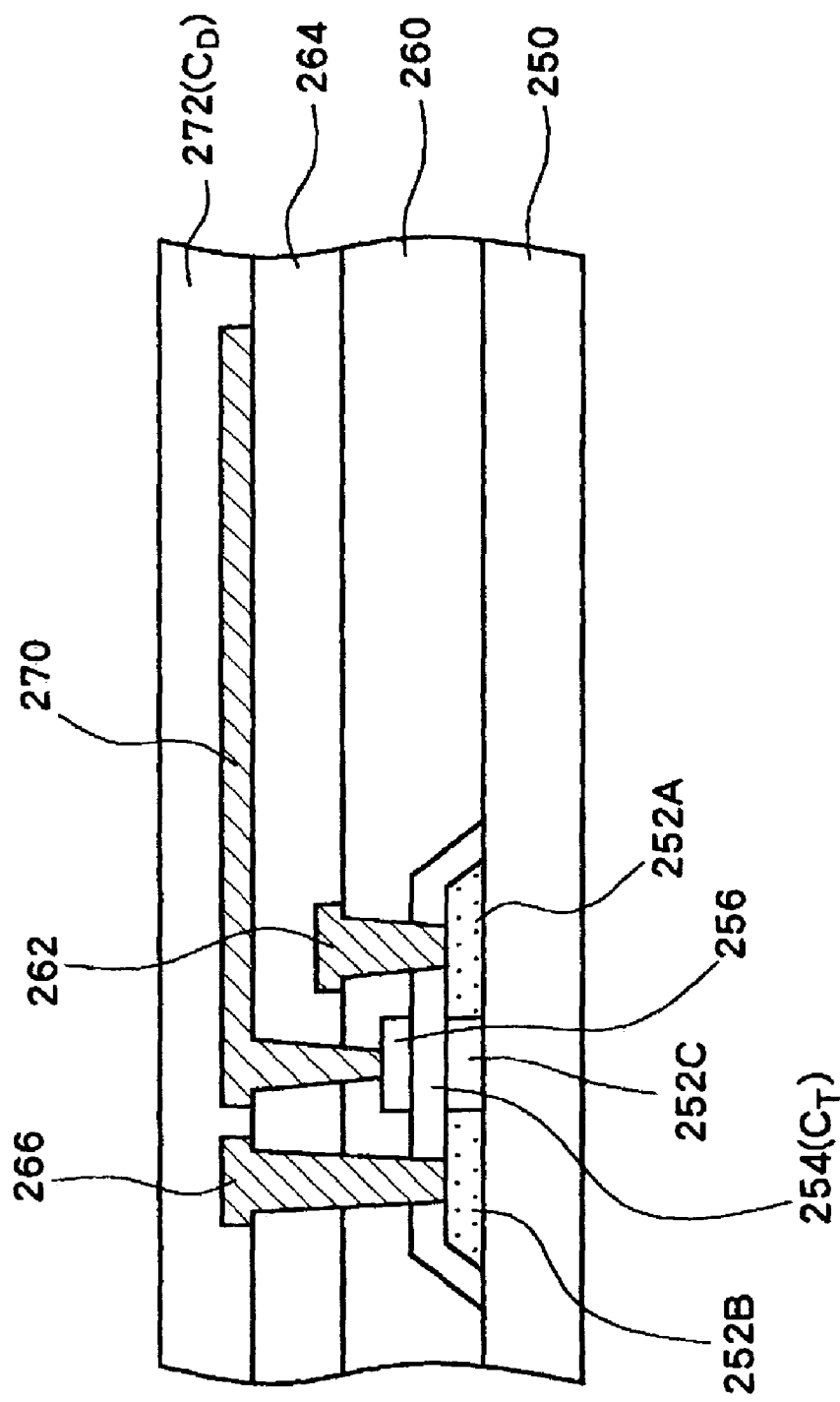
FIG. 13 is a cross-sectional view of a capacitance detection element shown in FIG. 12.

FIG. 13 is a cross-sectional view showing the capacitance detection element 204 shown in FIG. 12. FIG. 13 shows a state in which a finger is not in contact with the capacitance detection element 204. The capacitance detection element 204 includes a signal detection element 208 in addition to the signal amplification TFT 206 which is the signal amplification element.

In FIG. 13, a semiconductor film 252 including a source region 252A, a drain region 252B, and a channel region 252C present between the source region 252A and the drain region 252B is formed on an insulating layer 250. A gate insulating film 254 is formed on the semiconductor film 252. A gate electrode 256 is formed in a region which faces the channel region 252C with the gate insulating film 254 interposed therebetween. The semiconductor film 252, the gate insulating film 254, and the gate electrode 256 make up the signal amplification TFT 206. The power supply pass gate 210 and the output signal pass gate 230 are formed in the same manner as the signal amplification TFT 206.

The signal amplification TFT 206 is covered with a first interlayer dielectric 260. A first interconnection layer 262 corresponding to the output line 202 shown in FIG. 12 is formed on the first interlayer dielectric 260. The first interconnection layer 262 is connected with the source region 252A of the signal amplification TFT 206.

The first interconnection layer 262 is covered with a second interlayer dielectric 264. A second interconnection layer 266 corresponding to the power supply line 200 shown in FIG. 12 is formed on the second interlayer dielectric 264. The second interconnection layer 266 is connected with the drain region 252B of the signal amplification TFT 206. As another structure differing from the structure shown in FIG. 13, the second interconnection layer 266 may be formed on the first interlayer dielectric 260, and the first interconnection layer 262 may be formed on the second interlayer dielectric 264.

A capacitance detection electrode 270 is formed on the second interlayer dielectric 264. A capacitance detection dielectric film 272 is formed to cover the capacitance detection electrode 270. The capacitance detection dielectric film 272 is located on the outermost surface of the fingerprint sensor 40 and also functions as a protective film. A finger comes in contact with the capacitance detection dielectric film 272A. The signal detection element 208 is made up of the capacitance detection electrode 270 and the capacitance detection dielectric film 272.

Fingerprint Detection Operation

A fingerprint is detected by allowing a finger to come in contact with the capacitance detection dielectric film 272 shown in FIG. 13. The start switch (pressure-sensitive switch, for example) 42 of the fingerprint sensor 40 is operated to allow a power supply inside the card-type information storage medium 100 to be operated, whereby power is automatically supplied to the fingerprint sensor 40. The card-type information storage medium 100 may be connected with the information processing device 110 shown in FIG. 2, and power may be supplied to the card-type information storage medium 100 from the power supply section 112 of the information processing device 110.

In the present embodiment, signals are sequentially removed from the M×N capacitance detection elements 204 by providing a power supply voltage to one power supply line 200 selected from the M power supply lines 200 shown in FIG. 12, and detecting the signal from one output line 202 selected from the N output lines 202.

The fingerprint detection operation is roughly divided into (1) a case where a ridge (projecting section) of the fingerprint pattern comes in contact with the capacitance detection dielectric film 272, and (2) a case where a valley (concave section) of the fingerprint pattern faces the capacitance detection dielectric film 272.

(1) Case Where Ridge (Projecting Section) of Fingerprint Pattern Comes in Contact with Capacitance Detection Dielectric Film 272

Figure 14:
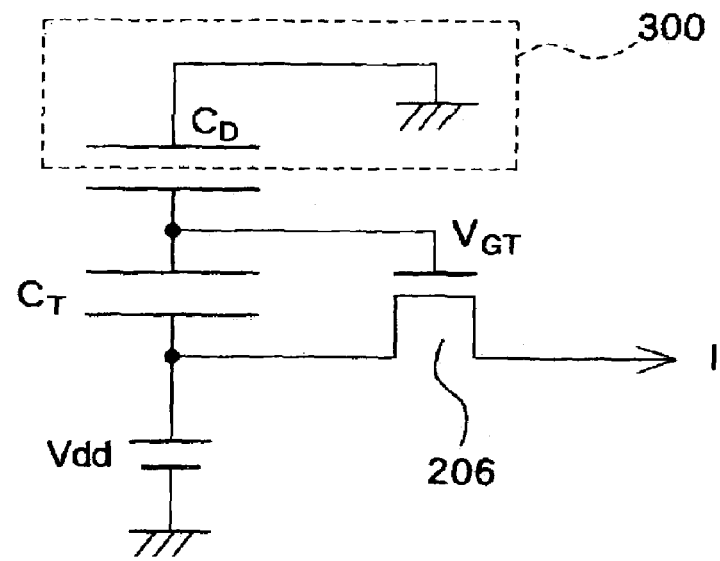
FIG. 14 is an equivalent circuit diagram of a capacitance detection element when a ridge of a fingerprint touches a dielectric film of a fingerprint sensor.

FIG. 14 shows an equivalent circuit of the capacitance detection element 204 in this case. A symbol 300 corresponds to a ridge of a fingerprint of a human body. A grounding electrode 300 which faces the capacitance detection electrode 270 shown in FIG. 13 with the dielectric film 272 interposed therebetween is formed in a region indicated by the symbol 300. A power supply voltage Vdd is supplied from the common power supply line 212. A symbol $C_T$ indicates a transistor capacitor of the signal amplification TFT 206. A symbol $C_D$ indicates a capacitor between the detection electrode 270 and the grounding electrode (finger) 300.

The length of the gate electrode of the signal amplification TFT 206 is referred to as L (μm), the width of the gate electrode is referred to as W (μm), the thickness of the gate insulating film is referred to as tox (μm), the relative dielectric constant of the gate insulating film is referred to as $\epsilon ox$, and the dielectric constant under vacuum is referred to as $\epsilon o$. The capacitance of the transistor capacitor $C_T$ is expressed by $C_T = \epsilon o \cdot \epsilon ox \cdot L \cdot W/tox$.

The area of the capacitance detection electrode 270 is referred to as S (μm$^2$), the thickness of the capacitance detection dielectric film 272 is referred to as td (μm$^2$), and the relative dielectric constant of the capacitance detection dielectric film 272 is referred to as $\epsilon d$. The capacitance of the capacitor $C_D$ is expressed by $C_D = \epsilon o \cdot \epsilon d \cdot S/td$.

In the equivalent circuit shown in FIG. 14, a voltage $V_{GT}$ applied to the gate of the signal amplification TFT 206 is expressed as follows.

$$V_{GT} = Vdd/(1+C_D/C_T) \tag{1}$$

If the capacitance of the capacitor $C_D$ is set sufficiently greater than the capacitance of the transistor capacitor $C_T$ ($C_D > 10 \times C_T$, for example), the denominator in the equation (1) becomes infinite, whereby $V_{GT}$ is approximated as follows.

$$V_{GT} \approx 0 \tag{2}$$

As a result, the signal amplification TFT 206 is in an off state since almost no voltage is applied to the gate of the signal amplification TFT 206. Therefore, current I which flows between the source and the drain of the signal amplification TFT 206 is extremely decreased. The measurement point can be judged to be the ridge (projecting section) of the fingerprint pattern by measuring the current I.

(2) Case Where Valley (Concave Section) of Fingerprint Pattern Faces Capacitance Detection Dielectric Film 272

Figure 15:
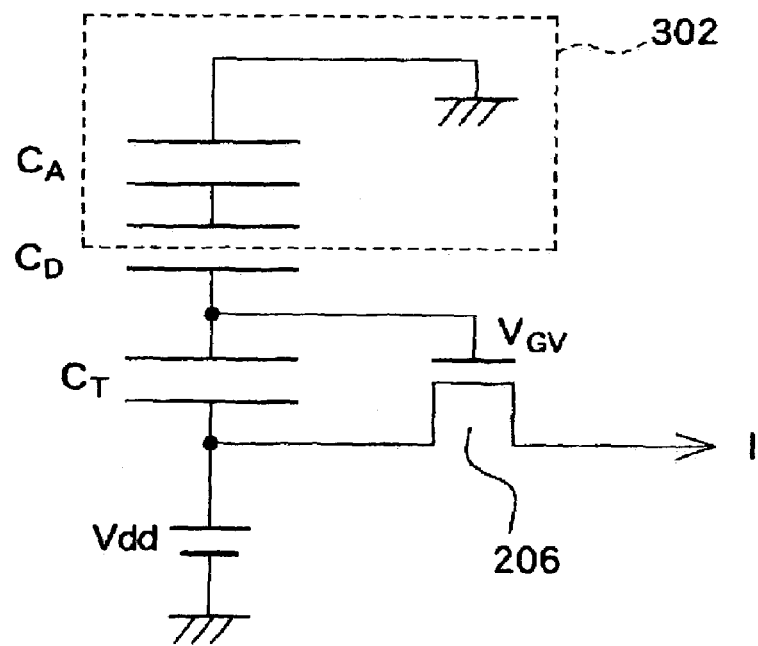
FIG. 15 is an equivalent circuit diagram of a capacitance detection element when a valley of a fingerprint touches a dielectric film of a fingerprint sensor.

FIG. 15 shows an equivalent circuit of the capacitance detection element 204 in this case. A symbol 302 corresponds to a valley of a fingerprint of a human body. In this case, a capacitor $C_A$ in which air is a dielectric is formed between the dielectric film 272 and the valley of the fingerprint in addition to the capacitor $C_D$ shown in FIG. 14.

In the equivalent circuit shown in FIG. 15, a voltage $V_{GV}$ applied to the gate of the signal amplification TFT 206 is expressed as follows.

$$V_{GV} = Vdd/\{[1+(1/C_T)] \times 1/[(1/C_D)+(1/C_A)]\} \tag{3}$$

If the capacitance of the capacitor $C_D$ is set sufficiently greater than the capacitance of the transistor capacitor $C_T$ ($C_D>10\times C_T$, for example), the equation (3) is approximated as follows.

$$V_{GI} \approx Vdd/[1+(C_A/C_T)] \quad (4)$$

If the capacitance of the transistor capacitor $C_T$ is set sufficiently greater than the capacitance of the capacitor $C_A$ formed by the valley of the fingerprint ($C_T>10\times C_A$, for example), the equation (3) is approximated as follows.

$$V_{GI} \approx Vdd \quad (5)$$

As a result, the signal amplification TFT 206 is in an on state since the power supply voltage Vdd is applied to the gate of the signal amplification TFT 206. Therefore, the current I which flows between the source and the drain of the signal amplification TFT 206 is extremely increased. The measurement point can be judged to be the valley (concave section) of the fingerprint pattern by measuring the current I.

The capacitance of the variable capacitor $C_F$ shown in FIG. 12 is the capacitance $C_D$ when the ridge of the fingerprint is in contact with the capacitance detection dielectric film 272, and is the sum of the capacitance $C_D$ and the capacitance $C_A$ when the valley of the fingerprint faces the capacitance detection dielectric film 272. Therefore, the capacitance of the variable capacitor $C_F$ varies corresponding to the ridge and valley of the fingerprint. The ridges or valleys of the fingerprint can be detected by detecting the current based on the change in capacitance corresponding to the ridges and valleys of the fingerprint.

The fingerprint pattern can be detected by carrying out the above-described operation in each of the M×N capacitance detection elements 204 by time division.

In the case where a positive power supply is used as the power supply voltage Vdd, the signal amplification TFT 206 is formed by using an enhancement N-type transistor in which a drain current does not flow at a gate voltage of about zero. In order to satisfy $C_D>10\times C_T$, provided that the gate voltage (minimum gate voltage) at which the drain current is minimum in the transfer characteristics of the signal amplification TFT 206 is Vmin, 0<Vmin<0.1×Vdd may be satisfied.

In the case where a negative power supply is used as the power supply voltage Vdd, the signal amplification TFT 206 is formed by using an enhancement P-type transistor in which a drain current does not flow at a gate voltage of about zero. In order to satisfy $C_D>10\times C_T$, provided that the gate voltage (minimum gate voltage) at which the drain current is minimum in the transfer characteristics of the signal amplification TFT 206 is Vmin, 0.1×Vdd<Vmin<0 may be satisfied.

Structure of Card Including Fingerprint Sensor and Pulse Wave Sensor

The card-type information storage medium 100 in the present embodiment may be formed by layering a first thin film device 400 including the fingerprint sensor 40 and a second thin film device 410 including the pulse wave sensor 50 on a card base substrate 420 formed of a flexible material such as a resin.

However, it is difficult to directly form the first and second thin film devices 400 and 410 on the card base substrate 420.

Figure 16:
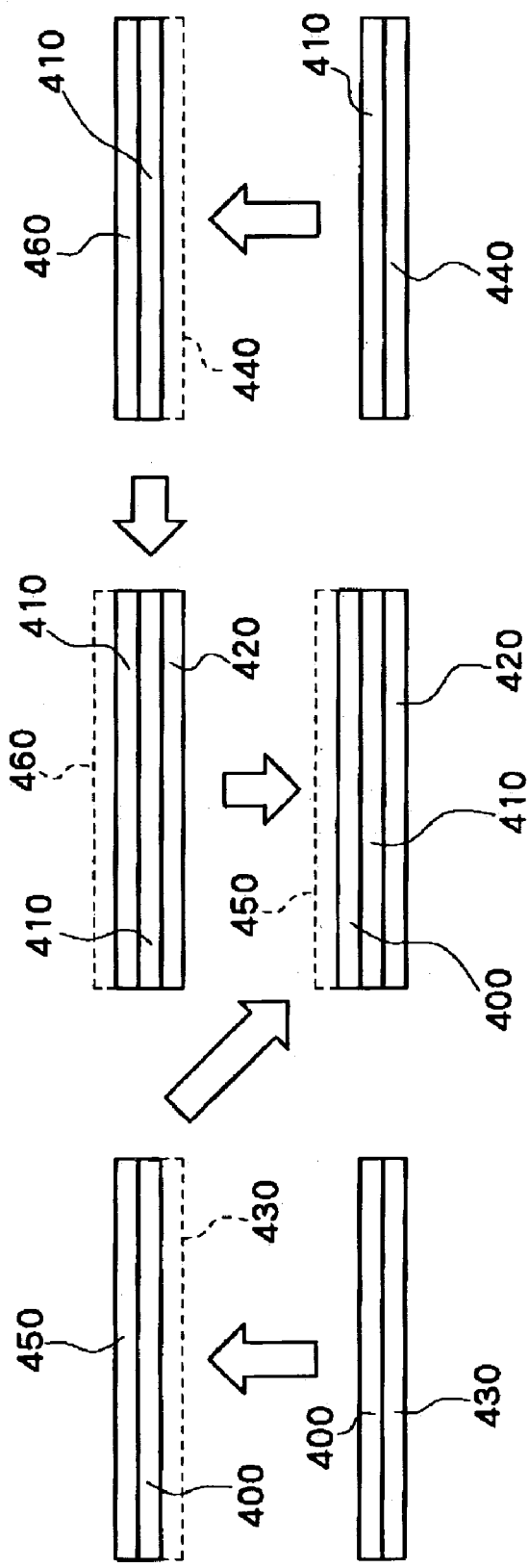
FIG. 16 is a schematic diagram for illustrating manufacturing steps of a card-type information storage medium utilizing transfer technology.

Therefore, the fingerprint sensor 40 is formed on a first substrate 430 as shown in FIG. 16, for example. In the case of forming the first substrate 430 by using a glass substrate, an amorphous silicon layer formed on the glass substrate is crystallized by applying a laser to form a polycrystalline silicon layer, whereby the semiconductor film 252 shown in FIG. 13 is formed. The first thin film device 400 including the fingerprint sensor 40 is formed on the first substrate 420 by performing a conventional thin film semiconductor manufacturing process.

The second thin film device 410 including the pulse wave sensor 50 is formed on a second substrate 440 as shown in FIG. 16, for example. In the method disclosed in Japanese Patent Application Laid-open No. 9-27611 or the like, a surface-emitting semiconductor laser and a photodiode are formed on the semiconductor substrate. In the case of using this manufacturing method, a semiconductor substrate is used as the second substrate 440.

The first and second thin film devices 400 and 410 are transferred onto the card base substrate 420 by using transfer technology disclosed by the applicant of the present invention (Japanese Patent Application Laid-open Nos. 10-125931, 10-177187, 11-20360, 11-26733, 11-26734, 11-74533, and 11-312811).

The first and second thin film devices 400 and 410 must be transferred onto the card base substrate 420 while maintaining the direction of the upper and lower sides. Therefore, the first substrate 430 and the first thin film device 400 are bonded to a third substrate 450, and the first substrate 430 is then removed. The second substrate 440 and the second thin film device 410 are bonded to a fourth substrate 460, and the second substrate 440 is then removed. The fourth substrate 460 and the second thin film device 410 are transferred onto the card base substrate 420, and the fourth substrate 460 is then removed. The third substrate 450 and the first thin film device 400 are transferred onto the second thin film device 410, and the third substrate 450 is then removed.

The first and second thin film devices 400 and 410 are stacked on the card base substrate 420 in this manner. The pulse wave sensor 50 may be disposed on the back side of the fingerprint sensor 40. It is preferable to form the capacitance detection electrode 270 by using a transparent conductive material such as indium oxide (ITO). Therefore, if a finger comes into contact with the capacitance detection dielectric film 272 of the fingerprint sensor 40, the fingerprint and the pulse wave can be detected from the single finger. This makes it extremely difficult to counterfeit both the fingerprint and the pulse wave, whereby reliability of personal verification is further increased.

In the case of disposing the pulse wave sensor 50 on the back side of the fingerprint sensor 40, the constituent material for the fingerprint sensor 40 must be transparent to the emission wavelength of the pulse wave sensor 40. Therefore, the first and second interconnection layers 262 and 266 and the capacitance detection electrode 270 shown in FIG. 13 are formed by using a transparent electrode (ITO, for example).

The present invention is not limited to the above-described embodiment. Various modifications and variations are possible within the spirit and scope of the present invention. For example, the personal verification device of the present invention may be mounted on portable electronic equipment or stationary electronic equipment other than the card-type information storage medium.

What is claimed is:

1. A personal verification device comprising:
   a first detection section that detects characteristic information of an operator;
   a second detection section that detects a pulse wave of the operator;

an index extraction section that extracts at least one index by processing the pulse wave detected by the second detection section;

a first storage section that stores first reference information that is compared with the characteristic information;

a second storage section that stores second reference information that is compared with the at least one index; and a verification section that outputs a signal indicating that the operator is true when the operator is determined to be the same person as a registered person based on the result of comparison between the characteristic information and the first reference information, and also to be alive based on the result of comparison between the at least one index and the second reference information, the characteristic information being a fingerprint, the first detection section being a fingerprint sensor that detects a capacitance that changes corresponding to ridges and valleys on a surface of a fingertip of the operator, and fingerprint information of the registered person being stored in the first storage section, the fingerprint sensor including a signal detection element and a signal amplification element, the signal detection element including a capacitance detection electrode and a capacitance detection dielectric film that covers the capacitance detection electrode, and the signal amplification element being formed of a signal amplification thin film MIS semiconductor device that includes a gate electrode, a gate insulating film, and a semiconductor film, and the gate electrode being connected to the capacitance detection electrode.

2. The personal verification device as defined in claim 1, the index extraction section including a wave height extraction section that extracts as the at least one index a wave height of at least one of a plurality of inflection points in the pulse wave detected by the second detection section.

3. The personal verification device as defined in claim 1, the index extraction section including a time extraction section that extracts as the at least one index the time until occurrence of at least one of a plurality of inflection points in the pulse wave detected by the second detection section.

4. The personal verification device as defined in claim 1, the index extraction section including a wave height ratio extraction section that extracts as the at least one index the wave height ratio of a plurality of inflection points in the pulse wave detected by the second detection section.

5. The personal verification device as defined in claim 1, the index extraction section including:
a calculation section which calculates an acceleration waveform of the pulse wave detected by the second detection section; and
a wave height ratio extraction section that extracts as the at least one index a wave height ratio of a plurality of inflection points in the acceleration waveform.

6. The personal verification device as defined in claim 1, the index extraction section including a time ratio extraction section that extracts as the at least one index the time ratio of a plurality of inflection points in the pulse wave detected by the second detection section.

7. The personal verification device as defined in claim 6, the time ratio extraction section extracting a ratio of a cycle and an ejection time of the pulse wave detected by the second detection section from the pulse wave.

8. The personal verification device as defined in claim 1, the index extraction section being an amplifier that amplifies the pulse wave detected by the second detection section, the amplifier extracting as the at least one index an amplification ratio when amplifying the pulse wave into a signal having an amplitude larger than a predetermined amplitude by using an auto gain control function.

9. The personal verification device as defined in claim 1, further comprising:
a historical information storage section that stores historical information on the at least one index extracted by the index extraction section; and
an information update section that updates the second reference information in the second storage section based on the historical information.

10. The personal verification device as defined in claim 1, when a capacitance of a transistor capacitor of the MIS semiconductor device being $C_T$ and a capacitance of a capacitor between the capacitance detection electrode and the fingertip of the operator being $C_D$, $C_T>10\times C_D$ being satisfied.

11. The personal verification device as defined in claim 10, when a capacitance of a capacitor formed by the valley of the fingerprint is $C_A$, $C_T>10\times C_A$ being satisfied.

12. The personal verification device as defined in claim 11,
the fingerprint sensor including M (M is an integer equal to or larger than two) rows of power supply lines, N (N is an integer equal to or larger than two) columns of output lines, and M×N capacitance detection elements respectively provided at intersections of the M rows of power supply lines and the N columns of output lines.

13. The personal verification device as defined in claim 12, further comprising:
a start switch that activates the personal verification device when the fingerprint sensor detects a touch of a finger.

14. The personal verification device as defined in claim 10,
the second detection section including a pulse wave sensor having a light emitting element and a light receiving element; and
the fingerprint sensor being provided on a top surface of the pulse wave sensor, and part of the fingerprint sensor intersecting the path of the light emitted by the light emitting element or received by the light receiving element being formed of a material transparent to the wavelength of the light emitted by the light emitting element.

15. The personal verification device as defined in claim 14,
the pulse wave sensor being forbidden to detect a pulse wave when a fingerprint detected by the fingerprint sensor has been determined to be false by the verification section.

16. A card-type information storage medium comprising the personal verification device as defined in claim 14,
a second thin film device having at least the fingerprint sensor being provided on a top surface of a first thin film device having at least the pulse wave sensor.

17. The card-type information storage medium as defined in claim 16, further comprising:
   a display section that displays notification that the card-type information storage medium is in an available state, based on the signal from the verification section.

18. An information processing system comprising:
   the card-type information storage medium as defined in claim 17; and
   an information processing device that performs processing based on information in the card-type information storage medium,
   the information processing device reading information other than the information used for personal verification from the card-type information storage medium, after the signal is inputted from the verification section.

19. The information processing system as defined in claim 18,
   the information processing device including a power supply section that supplies power to the card-type information storage medium.

20. The personal verification device as defined in claim 1,
   the fingerprint sensor further including a power supply select circuit connected to the M rows of power supply lines; and
   the power supply select circuit having M power supply pass gates provided between a common power supply line and the M rows of power supply lines, each of the M power supply pass gates being the thin film MIS semiconductor device for a signal amplification that includes a gate electrode, a gate insulating film, and a semiconductor film.

21. The personal verification device as defined in claim 1,
   the fingerprint sensor further including a signal select circuit connected to the N columns of output lines; and
   the signal select circuit having N output signal pass gates provided between a common output line and the N columns of output lines, each of the N output signal pass gates being the thin film MIS semiconductor device for a signal amplification that includes the thin film MIS semiconductor device for a signal amplification gate electrode, a gate insulating film, and a semiconductor film.

22. The personal verification device as defined in claim 1, the second detection section including a pulse wave sensor having
   a light emitting element and a light receiving element, and optically detecting the pulse wave of the operator.

23. The personal verification device as defined in claim 22, further comprising:
   a low-cut filter that cuts out a low frequency component from the pulse wave detected by the pulse wave sensor.

24. The personal verification device as defined in claim 23,
   the low-cut filter cutting out a low frequency in a range from 0.4 to 0.5 Hz.

25. A card-type information storage medium comprising the personal verification device as defined in claim 1.

26. The card-type information storage medium as defined in claim 25, further comprising:
   a display section that displays notification that the card-type information storage medium is in an available state, based on the signal from the verification section.

27. An information processing system comprising:
   the card-type information storage medium as defined in claim 25; and
   an information processing device that performs processing based on information in the card-type information storage medium,
   the information processing device reading information other than the information used for personal verification from the card-type information storage medium, after the signal is inputted from the verification section.

28. The information processing system as defined in claim 27,
   the information processing device having a power supply section that supplies power to the card-type information storage medium.

* * * * *